(12) United States Patent
Willig et al.

(10) Patent No.: US 9,996,094 B2
(45) Date of Patent: *Jun. 12, 2018

(54) NOC-ORIENTED APPARATUS AND METHOD FOR CONTROLLING PEAK ENERGY DEMAND

(71) Applicant: ENERNOC, INC., Boston, MA (US)

(72) Inventors: Randy C. Willig, Fort Collins, CO (US); Jeffrey P. Mathews, Longmont, CO (US)

(73) Assignee: ENERNOC, INC., Boston, MA (US)

( * ) Notice: Subject to any disclaimer, the term of this patent is extended or adjusted under 35 U.S.C. 154(b) by 454 days.

This patent is subject to a terminal disclaimer.

(21) Appl. No.: 14/691,907

(22) Filed: Apr. 21, 2015

(65) Prior Publication Data

US 2015/0227152 A1    Aug. 13, 2015

Related U.S. Application Data

(63) Continuation of application No. 13/601,622, filed on Aug. 31, 2012, now Pat. No. 9,049,078.
(Continued)

(51) Int. Cl.
*G06F 15/16* (2006.01)
*G06F 15/167* (2006.01)
(Continued)

(52) U.S. Cl.
CPC .............. *G05F 1/66* (2013.01); *G05B 13/04* (2013.01); *G05B 13/048* (2013.01); *G05B 15/02* (2013.01);
(Continued)

(58) Field of Classification Search
CPC ......... G05F 1/66; G05B 13/04; G05B 13/048; G05B 15/02; H02J 3/14; H02J 13/0062;
(Continued)

(56) References Cited

U.S. PATENT DOCUMENTS

| 4,023,043 A | 5/1977 | Stevenson |
| 4,804,957 A | 2/1989 | Selph et al. |

(Continued)

OTHER PUBLICATIONS

Barker, Sean et al. "SmartCap: Flattening Peak Electricity Demand in Smart Homes." 2012 IEEE International Conference on Pervasive Computing and Communications, Lugano (Mar. 19-23, 2012) pp. 67-75.

(Continued)

*Primary Examiner* — Yves Dalencourt
*Assistant Examiner* — Sahera Halim
(74) *Attorney, Agent, or Firm* — Richard K. Huffman

(57) ABSTRACT

Coupling a first and second nodes, and a monitor node together within a facility via network; via the monitor node, broadcasting whether a non-system device consumes a resource; via the first node, transmitting data and status via the network for generation of schedules, and operating a first device within an acceptable operating margin to maintain a first environment by cycling on and off according to the schedules; and via a network operations center external to the facility, generating the schedules to control peak demand of the resource, where one or more run times start prior to when otherwise required to maintain local environments, and coordinating run times for the first device and a second device, where coordination is based on a global schedule, an adjusted first descriptor set characterizing the first environment, and an adjusted second descriptor set characterizing a second environment, and data broadcast by the monitor node.

20 Claims, 15 Drawing Sheets

Related U.S. Application Data

(60) Provisional application No. 61/529,902, filed on Aug. 31, 2011.

(51) Int. Cl.

| | | |
|---|---|---|
| *G05F 1/66* | (2006.01) | |
| *H04L 29/08* | (2006.01) | |
| *H04L 12/911* | (2013.01) | |
| *G05B 13/04* | (2006.01) | |
| *G05B 15/02* | (2006.01) | |
| *H02J 3/14* | (2006.01) | |
| *H02J 13/00* | (2006.01) | |

(52) U.S. Cl.
CPC ............ *H02J 3/14* (2013.01); *H02J 13/0062* (2013.01); *H04L 29/08468* (2013.01); *H04L 47/70* (2013.01); *H04L 67/10* (2013.01); *H04L 67/125* (2013.01); *H04L 67/325* (2013.01); *Y02B 70/3225* (2013.01); *Y02B 90/2638* (2013.01); *Y04S 20/222* (2013.01); *Y04S 40/124* (2013.01)

(58) Field of Classification Search
CPC ... H04L 29/08468; H04L 47/70; H04L 67/10; H04L 67/125; H04L 67/3225; Y02B 70/3225; Y02B 90/2638; Y04S 20/222; Y04S 40/124
USPC ........ 700/295, 286, 291; 709/226, 227, 249, 709/229, 224
See application file for complete search history.

(56) References Cited

U.S. PATENT DOCUMENTS

| | | | |
|---|---|---|---|
| 5,274,571 | A | 12/1993 | Hesse et al. |
| 5,815,811 | A | 9/1998 | Pinard et al. |
| 5,897,607 | A | 4/1999 | Jenney et al. |
| 6,437,743 | B1 | 8/2002 | Mintz et al. |
| 6,512,737 | B1 | 1/2003 | Agee |
| 7,102,533 | B2 | 9/2006 | Kim |
| 7,177,728 | B2 | 2/2007 | Gardner |
| 7,376,122 | B2 | 5/2008 | Draves, Jr. et al. |
| 7,379,997 | B2 | 5/2008 | Ehlers et al. |
| 7,495,578 | B2 | 2/2009 | Borleske |
| 7,580,775 | B2 | 8/2009 | Kulyk et al. |
| 7,715,951 | B2 | 5/2010 | Forbes, Jr. et al. |
| 7,769,149 | B2 | 8/2010 | Berkman |
| 7,783,390 | B2 | 8/2010 | Miller |
| 7,894,946 | B2 | 2/2011 | Kuylyk et al. |
| 7,949,615 | B2 | 5/2011 | Ehlers et al. |
| 7,992,630 | B2 | 8/2011 | Springer et al. |
| 8,041,467 | B2 | 10/2011 | Black et al. |
| 8,078,330 | B2 | 12/2011 | Brickfield et al. |
| 8,180,328 | B2 | 5/2012 | Van De Groenendaal |
| 8,185,245 | B2 | 5/2012 | Amundson et al. |
| 8,367,984 | B2 | 2/2013 | Besore et al. |
| 8,457,803 | B2* | 6/2013 | Willig ..................... H02J 3/14 700/286 |
| 9,049,078 | B2* | 6/2015 | Willig ................... H04L 67/125 |
| 2002/0186167 | A1 | 12/2002 | Anderson |
| 2003/0112753 | A1 | 6/2003 | Jo et al. |
| 2004/0139038 | A1* | 7/2004 | Ehlers ................. F24F 11/0012 705/412 |
| 2004/0150510 | A1 | 8/2004 | Taki et al. |
| 2005/0055432 | A1 | 3/2005 | Rodgers |
| 2005/0073992 | A1 | 4/2005 | Lee et al. |
| 2005/0078631 | A1 | 4/2005 | Cornwall |
| 2005/0192713 | A1 | 9/2005 | Weik et al. |
| 2005/0282570 | A1 | 12/2005 | Pulkkinen et al. |
| 2006/0072694 | A1 | 4/2006 | Dai et al. |
| 2006/0104205 | A1 | 5/2006 | Strutt et al. |
| 2006/0135121 | A1 | 6/2006 | Abedi et al. |
| 2007/0005193 | A1* | 1/2007 | Nelson .................... G06Q 10/06 700/286 |
| 2007/0013547 | A1 | 1/2007 | Boaz |
| 2007/0019552 | A1 | 1/2007 | Senarath et al. |
| 2007/0060132 | A1 | 3/2007 | Wilhelmsson et al. |
| 2007/0099624 | A1 | 5/2007 | Guo |
| 2007/0211687 | A1 | 9/2007 | Benjebbour et al. |
| 2007/0255461 | A1* | 11/2007 | Brickfield ............... H02J 3/008 700/295 |
| 2008/0012724 | A1 | 1/2008 | Corcoran et al. |
| 2008/0013502 | A1 | 1/2008 | Clark |
| 2008/0125069 | A1 | 5/2008 | Davis et al. |
| 2008/0192724 | A1 | 8/2008 | Kondo et al. |
| 2008/0205292 | A1 | 8/2008 | Denby et al. |
| 2008/0225737 | A1 | 9/2008 | Gong et al. |
| 2008/0267259 | A1 | 10/2008 | Budampati et al. |
| 2009/0005029 | A1 | 1/2009 | Wang et al. |
| 2009/0102680 | A1 | 4/2009 | Roos |
| 2009/0167558 | A1 | 7/2009 | Borleske et al. |
| 2009/0185542 | A1 | 7/2009 | Zhang et al. |
| 2009/0325566 | A1 | 12/2009 | Bell et al. |
| 2010/0039263 | A1 | 2/2010 | Chen et al. |
| 2010/0088261 | A1 | 4/2010 | Montalvo |
| 2010/0156632 | A1 | 6/2010 | Hyland et al. |
| 2010/0217450 | A1* | 8/2010 | Beal ........................ H02J 3/14 700/291 |
| 2010/0217550 | A1 | 8/2010 | Crabtree et al. |
| 2010/0217651 | A1 | 8/2010 | Crabtree et al. |
| 2010/0278187 | A1 | 11/2010 | Hart et al. |
| 2010/0328097 | A1 | 12/2010 | Leo et al. |
| 2011/0013586 | A1 | 1/2011 | Oh et al. |
| 2011/0035073 | A1 | 2/2011 | Ozog |
| 2011/0037612 | A1 | 2/2011 | Cornwall |
| 2011/0063126 | A1 | 3/2011 | Kennedy et al. |
| 2011/0196513 | A1 | 8/2011 | Willig et al. |
| 2011/0280178 | A1 | 11/2011 | Heifner |
| 2011/0282504 | A1 | 11/2011 | Besore et al. |
| 2011/0286505 | A1 | 11/2011 | Hedley et al. |
| 2012/0019395 | A1 | 1/2012 | Willig et al. |
| 2012/0113868 | A1 | 5/2012 | Cummings |
| 2012/0232701 | A1 | 9/2012 | Carty et al. |
| 2012/0253527 | A1 | 10/2012 | Hietala et al. |
| 2012/0320768 | A1 | 12/2012 | Shaffer et al. |
| 2013/0024710 | A1 | 1/2013 | Jackson |
| 2013/0181847 | A1 | 7/2013 | Willig et al. |
| 2013/0185437 | A1 | 7/2013 | Willig et al. |
| 2013/0195036 | A1 | 8/2013 | Quan et al. |
| 2013/0297091 | A1 | 11/2013 | Willig et al. |
| 2013/0297092 | A1 | 11/2013 | Willig et al. |
| 2013/0304273 | A1 | 11/2013 | Willig et al. |
| 2015/0074282 | A1 | 3/2015 | Willig |
| 2015/0081052 | A1 | 3/2015 | Willig |
| 2015/0081053 | A1 | 3/2015 | Willig |
| 2015/0081105 | A1 | 3/2015 | Willig et al. |
| 2015/0081128 | A1 | 3/2015 | Willig |
| 2015/0081915 | A1 | 3/2015 | Willig |
| 2015/0088328 | A1 | 3/2015 | Willig |

OTHER PUBLICATIONS

Irwin, David et al. "Exploiting Home Automation Protocols for Load Monitoring in Smart Buildings." Proceedings of the Third ACM Workshop on Embedded Sensing Systems for Energy-Efficiency in Buildings, Buildsys '11. Jan. 11, 2011. pp. 7-12.

* cited by examiner

NOC-ORIENTED APPARATUS AND METHOD FOR CONTROLLING PEAK ENERGY DEMAND

CROSS-REFERENCE TO RELATED APPLICATIONS

This application is a continuation of the following U.S. nonprovisional application.

| SER. NO. | FILING DATE | TITLE |
|---|---|---|
| 13/601,622 | Aug. 31, 2012 | NOC-ORIENTED CONTROL OF A DEMAND COORDINATION NETWORK |

The above noted U.S. nonprovisional application claims the benefit of the following U.S. provisional application, which is herein incorporated by reference for all intents and purposes.

| SER. NO. | FILING DATE | TITLE |
|---|---|---|
| 61/529,902 | Aug. 31, 2011 | DEMAND COORDINATION NETWORK EXTENSIONS |

This application is related to the following U.S. nonprovisional applications.

| SER. NO. | FILING DATE | TITLE |
|---|---|---|
| 13/025,142 | Feb. 10, 2011 | APPARATUS AND METHOD FOR DEMAND COORDINATION NETWORK |
| 13/864,933 | Apr. 17, 2013 | DEMAND COORDINATION NETWORK CONTROL NODE |
| 13/864,942 | Apr. 17, 2013 | APPARATUS AND METHOD FOR CONTROLLING PEAK ENERGY DEMAND |
| 13/864,954 | Apr. 17, 2013 | CONFIGURABLE DEMAND MANAGEMENT SYSTEM |
| 13/032,622 | Feb. 22, 2011 | APPARATUS AND METHOD FOR NETWORK-BASED GRID MANAGEMENT |
| 14/547,919 | Nov. 19, 2014 | NETWORK LATENCY TOLERANT CONTROL OF A DEMAND COORDINATION NETWORK |
| 14/547,962 | Nov. 19, 2014 | APPARATUS AND METHOD FOR PASSIVE MODELING OF NON-SYSTEM DEVICES IN A DEMAND COORDINATION NETWORK |
| 14/547,992 | Nov. 19, 2014 | APPARATUS AND METHOD FOR ACTIVE MODELING OF NON-SYSTEM DEVICES IN A DEMAND COORDINATION NETWORK |
| 14/548,023 | Nov. 19, 2014 | APPARATUS AND METHOD FOR EVALUATING EQUIPMENT OPERATION IN A DEMAND COORDINATION NETWORK |
| 14/548,057 | Nov. 19, 2014 | APPARATUS AND METHOD FOR ANALYZING NORMAL FACILITY OPERATION IN A DEMAND COORDINATION NETWORK |
| 14/548,097 | Nov. 19, 2014 | APPARATUS AND METHOD FOR MANAGING COMFORT IN A DEMAND COORDINATION NETWORK |
| 14/548,107 | Nov. 19, 2014 | DEMAND COORDINATION SYNTHESIS SYSTEM |
| 14/691,858 | Apr. 21, 2015 | NOC-ORIENTED DEMAND COORDINATION NETWORK CONTROL NODE |
| 14/691,945 | Apr. 21, 2015 | CONFIGURABLE NOC-ORIENTED DEMAND MANAGEMENT SYSTEM |
| 14/674,057 | Mar. 31, 2015 | APPARATUS AND METHOD FOR DEMAND COORDINATION NETWORK CONTROL |

BACKGROUND OF THE INVENTION

Field of the Invention

This invention relates in general to the field of resource management, and more particularly to an off-site apparatus and method for coordinating the use of certain resources such that a peak demand of those resources is optimized.

Description of the Related Art

The problem with resources such as electrical power, water, fossil fuels, and their derivatives (e.g., natural gas) is that the generation and consumption of a resource both vary with respect to time. Furthermore, the delivery and transport infrastructure is limited in that it cannot instantaneously match generation levels to provide for consumption levels. The delivery and transport infrastructure is limited in supply and the demand for this limited supply is constantly fluctuating. As anyone who has participated in a rolling blackout will concur, the times are more and more frequent when resource consumers are forced to face the realities of limited resource supply.

Most notably, the electrical power generation and distribution community has begun to take proactive measures to protect limited instantaneous supplies of electrical power by imposing a demand charge on consumers in addition to their monthly usage charge. In prior years, consumers merely paid for the total amount of power that they consumed over a billing period. Today, most energy suppliers are not only charging customers for the total amount of electricity they have consumed over the billing period, but they are additionally charging for peak demand. Peak demand is the greatest amount of energy that a customer uses use during a measured period of time, typically on the order of minutes.

For example, consider a factory owner whose building includes 20 air conditioners, each consuming 10 KW when turned on. If they are all on at the same time, then the peak demand for that period is 200 KW. Not only does the energy supplier have to provide for instantaneous generation of this power in conjunction with loads exhibited by its other consumers, but the distribution network that supplies this peak power must be sized such that it delivers 200 KW.

Consequently, high peak demand consumers are required to pay a surcharge to offset the costs of peak energy generation and distribution. And the concept of peak demand charges, while presently being levied only to commercial electricity consumers and to selected residential consumers, is applicable to all residential consumers and consumers of other limited generation and distribution resources as well. Water and natural gas are prime examples of resources that will someday exhibit demand charges.

Yet, consider that in the facility example above it is not time critical or comfort critical to run every air conditioning unit in the building at once. Run times can be staggered, for example, to mitigate peak demand. And this technique is what is presently employed in the industry to lower peak demand. There are very simply ways to stagger run times, and there are very complicated mechanisms that are employed to lower peak demand, but they all utilize variations of what is known in the art as deferral.

Stated simply, deferral means that some devices have to wait to run while other, perhaps higher priority, devices are allowed to run. Another form of deferral is to reduce the duty cycle (i.e., the percentage of the a device cycle that a device is on) of one or more devices in order to share the reduction in peak demand desired. What this means in the air conditioning example above is that some occupants are going to experience discomfort while waiting for their turn to run. When duty cycles are reduced to defer demand, everyone in the facility is going to experience mild discomfort. And as one skilled in the art will appreciate, there is a zone of comfort beyond which productivity falls.

Virtually every system of resource consuming devices exhibits a margin of acceptable operation ("comfort zone" in the air conditioning example above) around which operation of the device in terms of start time, duration, and duty cycle can be deferred. But the present inventors have observed that conventional techniques for controlling peak demand all involve delaying ("deferring") the start times and durations of devices and/or decreasing the duty cycles, thus in many instances causing local environments to operate outside of their acceptable operational margins. It is either too hot, too cold, not enough water, the motors are not running long enough to get the job done, and etc.

Accordingly, what is needed is an apparatus and method for managing peak demand of a resource that considers acceptable operational margins in determining when and how long individual devices in a system will run.

What is also needed is a technique for scheduling run times for devices in a controlled system that is capable of advancing the start times and durations of those devices, and that is capable of increasing the duty cycles associated therewith in order to reduce demand while concurrently maintaining operation within acceptable operational margins.

What is additionally needed is a mechanism for modeling and coordinating the operation of a plurality of devices in order to reduce peak demand of a resource, where both advancement and deferral are employed effectively to reduce demand and retain acceptable operational performance.

What is moreover needed is an demand coordination apparatus and method that employs adaptive modeling of local environments and anticipatory scheduling of run times in order to reduce peak demand while maintaining acceptable operation.

Furthermore, what is needed is a demand coordination mechanism that will perform reliably and deterministically in the presence of periodic network disruptions.

Also, what is needed is a technique for characterizing consumption of a resource by one or more devices by passively monitoring a corresponding resource meter.

In addition, what is needed is a mechanism for characterizing consumption of a resource by one or more devices by actively cycling the one or more devices and monitoring a corresponding resource meter.

Furthermore, what is needed is a technique for analyzing a system of devices within a facility with respect to consumption of a resource.

Moreover, what is needed is a mechanism for controlling a comfort level within a facility by substituting interrelated devices in order to control consumption of a resource.

In addition, what is needed is a technique for identifying candidate buildings for application of resource demand management mechanisms.

SUMMARY OF THE INVENTION

The present invention, among other applications, is directed to solving the above-noted problems and addresses other problems, disadvantages, and limitations of the prior art. The present invention provides a superior technique for managing and controlling the demand level of a given resource as that resource is consumed by a plurality of consuming devices. In one embodiment, an apparatus for controlling peak demand of a resource within a facility is provided. The apparatus has a monitor node, a first control node, and a network operations center (NOC). The monitor node is disposed within the facility, and is coupled to a non-system energy consuming device and to a demand coordination network, and is configured to determine and broadcast whether the non-system device is consuming the resource. The first control node is disposed within the facility and is coupled to a second control node via the demand coordination network. The first control node includes a node processor. The processor is coupled to a first energy consuming device, and is configured to transmit sensor data and device status via the demand coordination network for generation of a plurality of run time schedules, and is configured to operate the first energy consuming device within an acceptable operating margin to maintain a first local environment by cycling on and off according to the plurality of run time schedules. The NOC is disposed external to the facility, and is configured to generate the plurality of run time schedules to control the peak demand of the resource, where one or more run times start prior to when otherwise required to maintain corresponding local environments. The NOC has a global schedule module that is operationally coupled to the first node processor. The module is configured to coordinate run times for the first energy consuming device and a second energy consuming device, where coordination is based on a global run time schedule, an adjusted first descriptor set characterizing the first local environment, and an adjusted second descriptor set characterizing a second local environment, and energy consumption data broadcast by the monitor node.

One aspect of the present invention contemplates a peak demand control system, for managing peak energy demand within a facility. The peak demand control system includes a monitor node, a first control node, a network operations center (NOC), and one or more sensor nodes. The monitor node is disposed within the facility, and is coupled to a non-system energy consuming device and to a demand coordination network, and is configured to determine and broadcast whether the non-system device is consuming the resource. The first control node is disposed within the facility, and is coupled to a second control node via the demand coordination network. The first control node has a node processor coupled to a first energy consuming device. The first control node is configured to transmit sensor data and device status via the demand coordination network for generation of a plurality of run time schedules, and is configured to operate the first energy consuming device within an acceptable operating margin to maintain a first local environment by cycling on and off according to the plurality of run time schedules. The NOC is disposed external to the facility, and is configured to generate the plurality of run time schedules to control the peak demand of the resource, where one or more run times start prior to when otherwise required to maintain corresponding local environments. The NOC has a global schedule module, operationally coupled to the first node processor, and is configured to coordinate run times for the first energy consuming device and a second energy consuming device, where coordination is based on a global run time schedule, an adjusted first descriptor set characterizing the first local environment, and an adjusted second descriptor set characterizing a second local environment, and energy consumption data broadcast by the monitor node. The one or more sensor nodes is disposed within the facility, and is coupled to the demand coordination network, and is configured to provide one or more global sensor data sets to the NOC, where the NOC employs the one or more global sensor data sets in determining the run times.

Another aspect of the present invention comprehends a method for controlling peak demand of a resource within a facility. The method includes coupling a first control node, a second control node, and a monitor node together within the facility via a demand coordination network; via the monitor node, determining and broadcasting whether a non-system device is consuming the resource; via the first control node, transmitting sensor data and device status via the demand coordination network for generation of a plurality of run time schedules, and operating a first energy consuming device within an acceptable operating margin to maintain a first local environment by cycling on and off according to the plurality of run time schedules; and via a network operations center (NOC) disposed external to the facility, generating the plurality of run time schedules to control the peak demand of the resource, where one or more run times start prior to when otherwise required to maintain corresponding local environments, and coordinating run times for the first energy consuming device and a second energy consuming device, where coordination is based on a global run time schedule, an adjusted first descriptor set characterizing the first local environment, and an adjusted second descriptor set characterizing a second local environment, and energy consumption data broadcast by the monitor node.

BRIEF DESCRIPTION OF THE DRAWINGS

These and other objects, features, and advantages of the present invention will become better understood with regard to the following description, and accompanying drawings where.

DETAILED DESCRIPTION

Figure 1:
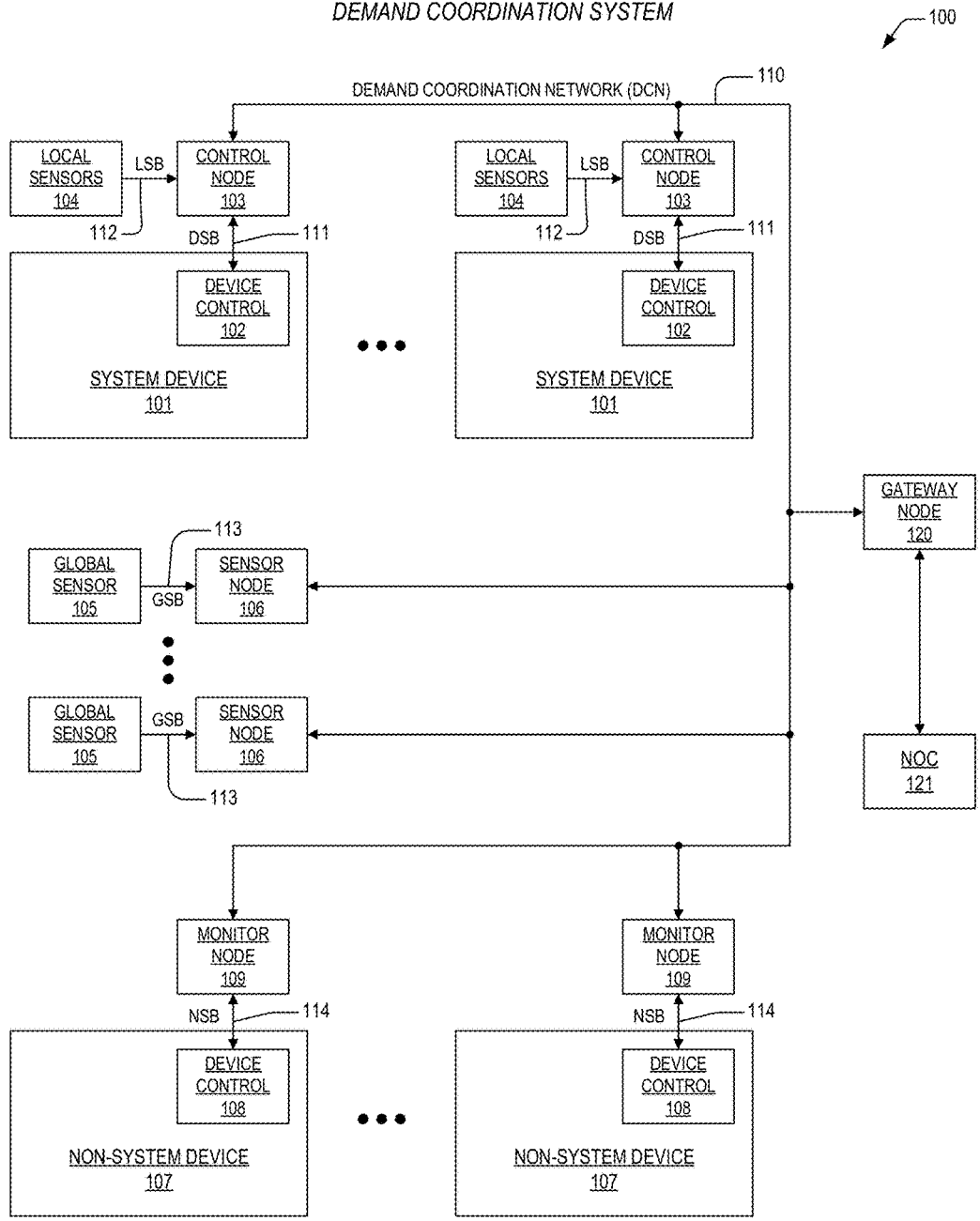
FIG. 1 is a block diagram illustrating a demand coordination system according to the present invention.

Exemplary and illustrative embodiments of the invention are described below. In the interest of clarity, not all features of an actual implementation are described in this specification, for those skilled in the art will appreciate that in the development of any such actual embodiment, numerous implementation-specific decisions are made to achieve specific goals, such as compliance with system related and/or business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In view of the above background discussion on resource and energy demand and associated techniques employed within systems to control peak demand, a discussion of the present invention will now be presented with reference to FIGS. 1-7. The present invention provides for more flexible and optimal management and control of resource consumption, such as electrical energy, by enabling use of particular resources to be coordinated among resource consuming devices. In stark contrast to prior art mechanisms, the present invention employs scheduling techniques that allow for advancement, or preemptive cycling of devices, as well as deferral.

Referring to FIG. 1, a block diagram is presented illustrating a demand coordination system 100 according to the present invention. The system 100 includes a plurality of system devices 101, each of which is managed and controlled within the system 100 for purposes of consumption control in order to manage peak resource demand. In one embodiment, the system devices 101 comprise air-conditioning units that are disposed within a building or other facility, and the resource that is managed comprises electrical power. In another embodiment, the system devices 101 comprise heating units that are disposed within a building or other facility, and the resource that is managed comprises natural gas. The present inventors specifically note that the system 100 contemplated herein is intended to be preferably employed to control any type of resource consuming device 101 such as the units noted above, and also including, but not limited to, water pumps, heat exchangers, motors, generators, light fixtures, electrical outlets, sump pumps, furnaces, or any other device that is capable of being duty-cycle actuated in order to reduce peak demand of a corresponding resource, but which is also capable, in one embodiment, of maintaining a desired level of performance ("comfort level") by advancing or deferring actuation times and increasing or decreasing duty cycles in coordination with other substantially similar devices 101. Thus, the term "comfort level" may also connote an acceptable level of performance for a device or machine that satisfies overall constraints of an associated system 100. The present inventors also note that the present invention comprehends any form of consumable resource including, but not limited to, electrical power, natural gas, fossil fuels, water, and nuclear power. As noted above, present day mechanisms are in place by energy suppliers to levy peak demand charges for the consumption of electrical power by a consumer and, going forward, examples are discussed in terms relative to the supply, consumption, and demand coordination of electrical power for purposes only of teaching the present invention in well-known subject contexts, but it is noted that any of the examples discussed herein may be also embodied to employ alternative devices 101 and resources as noted above for the coordination of peak demand of those resources within a system 100. It is also noted that the term "facility" is not to be restricted to construe a brick and mortar structure, but may also comprehend any form of interrelated system 100 of devices 101 whose performance can be modeled and whose actuations can be scheduled and controlled in order to control and manage the demand of a particular resource.

Having noted the above, each of the devices 101 includes a device control 102 that operates to turn the device 101 on, thus consuming a resource, and off, thus not consuming the resource. When the device 101 is off, a significant amount of the resource is consumed, and thus a device that is off does not substantially contribute to overall cumulative peak resource demand. Although implied by block diagram, the present inventors note that the device control 102 also may not be disposed within the device 101, and the device control 102 may not be collocated with the device 101.

A control node 103 according to the present invention is coupled to each of the device controls 102 via a device sense bus DSB 111 that is employed by the control node 103 to turn the device 101 on and off, to sense when the device 101 is turned on and off, and to further transparently enable the device 101 to operate independent of the demand coordination system 100 in a fail safe mode while at the same time sensing when the device 101 is turned on and turned off in the fail safe mode. Each of the control nodes 103 maintains control of their respective device 101 and in addition maintains a replicated copy of a global model of a system environment along with a global schedule for actuation of all of the devices 101 in the system 100. Updates to the global model and schedule, along with various sensor, monitor, gateway, configuration, and status messages are broadcast over a demand coordination network (DCN) 110, which interconnects all of the control nodes 103, and couples these control nodes to optional global sensor nodes 106, optional monitor nodes 109, and an optional gateway node 120. In one embodiment, the DCN 110 comprises an IEEE 802.15.4 packetized wireless data network as is well understood by those skilled in the art. Alternatively, the DCN 110 is embodied as an IEEE 802.11 packetized wireless or wired network. In another embodiment, the DCN 110 comprises a power line modulated network comporting with HOME-PLUG® protocol standards. Other packetized network configurations are additionally contemplated, such as a BLUETOOTH® low power wireless network. The present inventors note, however, that the present invention is distinguished from conventional "state machine" techniques for resource demand management and control in that only model updates and schedule updates are broadcast over the DCN 110, thus providing a strong advantage according to the present invention in light of network disruption. For the 802.15.4 embodiment, replicated model and schedule copies on each control node 103 along with model and schedule update broadcasts according to the present invention are very advantageous in the presence of noise and multipath scenarios commonly experienced by wireless packetized networks. That is, a duplicate model update message that may be received by one or more nodes 103 does not serve to perturb or otherwise alter effective operation of the system 100.

Zero or more local sensors 104 are coupled to each of the control nodes 103 via a local sensor bus 112, and configuration of each of the local sensors 104 may be different for each one of the devices 101. Examples of local sensors 104 include temperature sensors, flow sensors, light sensors, and other sensor types that may be employed by the control node 103 to determine and model an environment that is local to a particular system device 101. For instance, a temperature sensor 104 may be employed by a control node 103 to sense the temperature local to a particular device 101 disposed as an air-conditioning unit. Another unit may employ local sensors 104 comprising both a temperature and humidity sensor local to a device 101 disposed as an air-conditioning unit. Other examples abound. Other embodiments contemplate collocation of local sensors 104 and device control 102 for a device 101, such as the well-known thermostat.

The system 100 also optionally includes one or more global sensors 105, each of which is coupled to one or more sensor nodes 106 according to the present invention. The global sensors 105 may comprise, but are not limited to, occupancy sensors (i.e., movement sensors), solar radiation sensors, wind sensors, precipitation sensors, humidity sensors, temperature sensors, power meters, and the like. The sensors 105 are configured such that their data is employed to globally affect all modeled environments and schedules. For example, the amount of solar radiation on a facility may impact to each local environment associated with each of the system devices 101, and therefore must be considered when developing a global model of the system environment. In one embodiment, the global model of the system environment is an aggregate of all local models associated with each of the devices, where each of the local models are adjusted based upon the data provided by the global sensors 105.

Each of the global sensors 105 is coupled to a respective sensor node 106 according to the present invention via a global sensor bus (GSB) 113, and each of the sensor nodes 106 are coupled to the DCN 110. Operationally, the sensor nodes 106 are configured to sample their respective global sensor 105 and broadcast changes to the sensor data over the DCN 110 to the control nodes 110 and optionally to the gateway node 120.

The system 100 also optionally includes one or more non-system devices 107, each having associated device control 108 that is coupled to a respective monitor node 109 via a non-system bus (NSB) 114. Each of the monitor nodes 109 is coupled to the DCN 110. Operationally, each monitor node 109 monitors the state of its respective non-system device 107 via its device control 108 to determine whether the non-system device 107 is consuming the managed resource (i.e., turned on) or not (i.e., turned off). Changes to the status of each non-system device 107 are broadcast by its respective monitor node 109 over the DCN 110 to the control nodes 103 and optionally to the gateway node 120. The non-system devices 107 may comprise any type of device that consumes the resource being managed, but which is not controlled by the system 100. One example of such a non-system device 107 is an elevator in a building. The elevator consumes electrical power, but may not be controlled by the system 100 in order to reduce peak demand. Thus, in one embodiment, consumption of the resource by these non-system devices 107 is employed as a factor during scheduling of the system devices 101 in order to manage and control peak demand of the resource.

Optionally, the gateway node 120 is coupled by any known means to a network operations center (NOC) 121. In operation, configuration data for the system 100 may be provided by the NOC 121 and communicated to the gateway node 120. Alternatively, configuration data may be provided via the gateway node 120 itself. Typically, the gateway node 120 is collocated with the system 100 whereas the NOC 121 is not collocated and the NOC 121 may be employed to provide configuration data to a plurality of gateway nodes 120 corresponding to a plurality of systems 100. The configuration data may comprise, but is not limited to, device control data such as number of simultaneous devices in operation, device operational priority relative to other devices, percentage of peak load to employ, peak demand profiles related to time of day, and the like.

Thus, as will be described in more detail below, each of the control nodes 103 develops a local environment model that is determined from corresponding local sensors 104. Each local environment model, as changes to the local environment model occur, is broadcast over the DCN 110 to all other control nodes 103. Each of the control nodes 103 thus maintains a global environmental model of the system 100 which, in one embodiment, comprises an aggregation of all of the local environmental models. Each of the global models is modified to incorporate the effect of data provided by the global sensors 105. Thus, each identical global model comprises a plurality of local environmental models, each of which has been modified due to the effect of data provided by the global sensors 105. It is important to note that the term "environmental" is intended to connote a modeling environment which includes, but is not limited to, the physical environment.

Each control node 103, as will be described below, additionally comprises a global schedule which, like the global model, is an aggregate of a plurality of local run time schedules, each associated with a corresponding device 101. The global schedule utilizes the global model data in conjunction with configuration data and data provided by the monitor nodes 109, to develop the plurality of local run time schedules, where relative start times, duration times, and duty cycle times are established such that comfort margins associated with each of the local environments are maintained, in one embodiment, via maintaining, advancing (i.e., running early), or deferring (i.e., delaying) their respective start times and durations, and via maintaining, advancing, or deferring their respective duty cycles.

Figure 2:
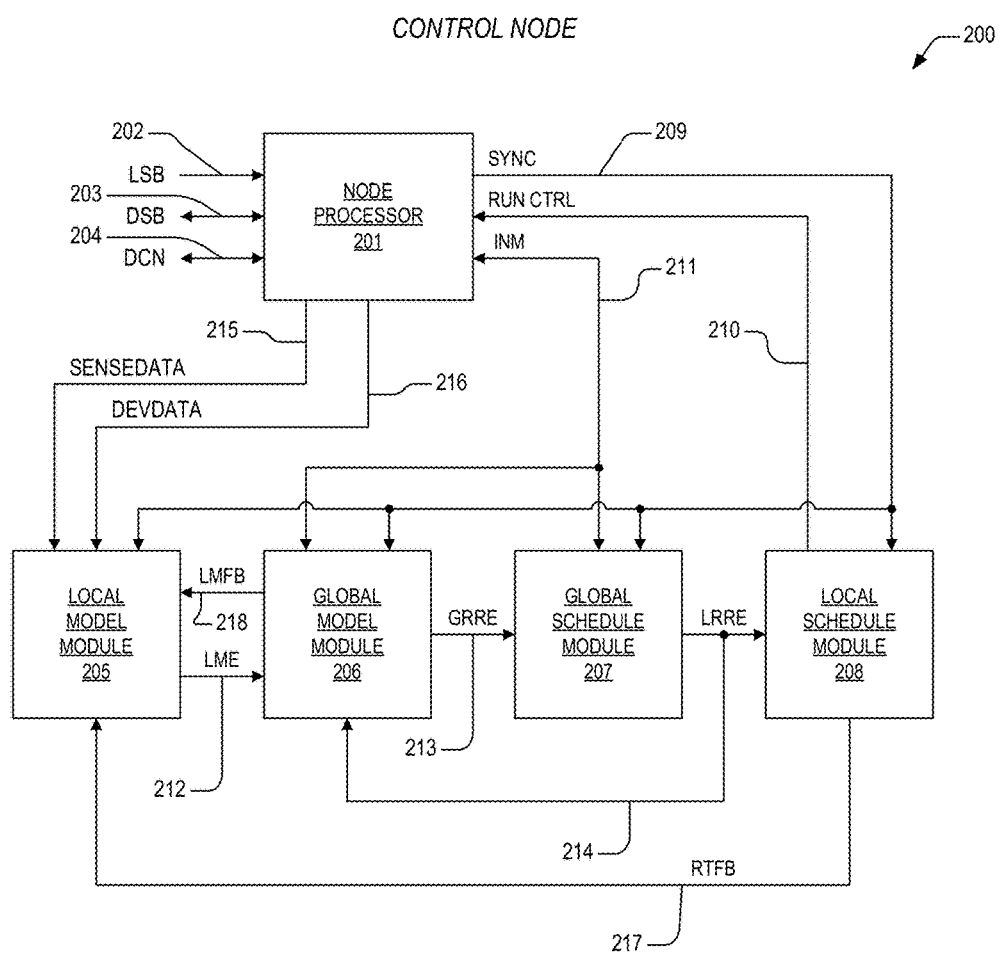
FIG. 2 is a block diagram depicting a control node according to the present invention.

Turning now to FIG. 2, a block diagram is presented depicting a control node 200 according to the present invention. The control node 200 includes a node processor 201 that is coupled to one or more local sensors (not shown) via a local sensor bus (LSB) 202, a device control (not shown) via a device sense bus (DSB) 203, and to a demand coordination network (DCN) 204 as has been described above with reference to FIG. 1.

The control node 200 also includes a local model module 205 that is coupled to the node processor 201 via a synchronization bus (SYNC) 209, a sensor data bus (SENSEDATA) 215, and a device data bus (DEVDATA) 216. The control node 200 also has a global model module 206 that is coupled to the node processor 201 via SYNC 209 and via an inter-node messaging bus (INM) 211. The global model module 206 is coupled to the local model module 205 via a local model environment bus (LME) 212. The control node 200 further includes a global schedule module 207 that is coupled to the node processor 201 via SYNC 209 and INM 211, and that is coupled to the global model module 206 via a global relative run environment bus (GRRE) 213. The control node finally includes a local schedule module 208 that is coupled to the node processor 201 via SYNC 209 and a run control bus (RUN CTRL) 210. The local schedule module 208 is also coupled to the global schedule module 207 via a local relative run environment bus (LRRE) 214. LRRE 214 is also coupled to the global model module 206. In addition, a run time feedback bus (RTFB) 217 couples the local schedule module 208 to the local model module 205.

The node processor 201, local model module 205, global model module 206, global schedule model 207, and local schedule model 208 according to the present invention are configured to perform the operations and functions as will be described in further detail below. The node processor 201 local model module 205, global model module 206, global schedule model 207, and local schedule model 208 each comprises logic, circuits, devices, or microcode (i.e., micro instructions or native instructions), or a combination of logic, circuits, devices, or microcode, or equivalent elements that are employed to perform the operations and functions described below. The elements employed to perform these operations and functions may be shared with other circuits, microcode, etc., that are employed to perform other functions within the control node 200. According to the scope of the present application, microcode is a term employed to refer to one or more micro instructions.

In operation, synchronization information is received by the node processor 201. In one embodiment, the synchronization information is time of day data that is broadcast over the DCN 204. In an alternative embodiment, a synchronization data receiver (not shown) is disposed within the node processor 201 itself and the synchronization data includes, but is not limited to, atomic clock broadcasts, a receivable periodic synchronization pulse such as an amplitude modulated electromagnetic pulse, and the like. The node processor 201 is further configured to determine and track relative time for purposes of tagging events and the like based upon reception of the synchronization data. Preferably, time of day is employed, but such is not necessary for operation of the system.

The node processor 201 provides periodic synchronization data via SYNC 209 to each of the modules 205-208 to enable the modules 205-208 to coordinate operation and to mark input and output data accordingly. The node processor 201 also periodically monitors data provided by the local sensors via LSB 202 and provides this data to the local model module 205 via SENSEDATA 215. The node processor 201 also monitors the DSB 203 to determine when an associated device (not shown) is turned on or turned off. Device status is provided to the local model module 205 via DEVDATA. The node processor 201 also controls the associated device via the DSB 203 as is directed via commands over bus RUN CTRL 210. The node processor further transmits and receives network messages over the DCN 204. Received message data is provided to the global model module 206 or the global schedule model 207 as appropriate over bus INM 211. Likewise, both the global model module 206 and the global schedule model 207 may initiate DCN messages via commands over bus INM 211. These DCN messages primarily include, but are not limited to, broadcasts of global model updates and global schedule updates. System configuration message data as described above is distributed via INM 211 to the global schedule module 207.

Periodically, in coordination with data provided via SYNC 209, the local model module employs sensor data provided via SENSEDATA 215 in conjunction with device actuation data provided via DEVDATA 216 to develop, refine, and update a local environmental model which comprises, in one embodiment, a set of descriptors that describe a relative time dependent flow of the local environment as a function of when the associated device is on or off. For example, if the device is an air conditioning unit and the local sensors comprise a temperature sensor, then the local model module 205 develops, refines, and updates a set of descriptors that describe a local temperature environment as a relative time function of the data provided via SYNC 209, and furthermore as a function of when the device is scheduled to run and the parameters associated with the scheduled run, which are received from the local schedule module 208 via RTFB 217. This set of descriptors is provided to the global model module 206 via LME 212. However, it is noted that these descriptors are updated and provided to LME 212 only when one or more of the descriptors change to the extent that an error term within the local model module 205 is exceeded. In addition to the descriptors, data provided on LME 212 by the local model module includes an indication of whether the descriptors accurately reflect the actual local environment, that is, whether the modeled local environment is within an acceptable error margin when compared to the actual local environment. When the modeled local environment exceeds the acceptable error margin when compared to the actual local environment, then the local model module 205 indicates that its local environment model is inaccurate over LME 212, and the system may determine to allow the associated device to run under its own control in a fail safe mode. For instance, if occupancy of a given local area remains consistent, then a very accurate model of the local environment will be developed over a period of time, and updates of the descriptors 212 will decrease in frequency, thus providing advantages when the DCN 204 is disrupted. It is noted that the error term will decrease substantially in this case. However, consider a stable local environment model that is continually perturbed by events that cannot be accounted for in the model, such as impromptu gatherings of many people. In such a case the error term will be exceeded, thus causing the local model module 205 to indicate over LME 212 that its local environment model is inaccurate. In the case of a system comprising air conditioning units, it may be determined to allow the associated unit to run in fail safe mode, that is, under control of its local thermostat. Yet, advantageously, because all devices continue to use their replicated copies of global models and global schedules, the devices continue to operate satisfactorily in the presences of disruption and network failure for an extended period of time. Additionally, if model error over time is known, then all devices in the network can utilize pre-configured coordination schedules, effectively continuing coordination over an extended period of time, in excess of the models ability to stay within a known margin of error. Furthermore, it can be envisioned that devices without a DCN, utilizing some externally sensible synchronization event, and with known model environments, could perform coordination sans DCN.

The local model module 205, in addition to determining the above noted descriptors, also maintains values reflecting accuracy of the local sensors, such as hysteresis of a local thermostat, and accounts for such in determining the descriptors. Furthermore, the local model module 205 maintains and communicates via LME 212 acceptable operation margin data to allow for advancement or deferral of start times and durations, and increase or decrease of duty cycles. In an air conditioning or heating environment, the acceptable operation margin data may comprise an upper and lower temperature limit that is outside of the hysteresis (set points) of the local temperature sensor, but that is still acceptable from a human factors perspective in that it is not noticeable to a typical person, thus not adversely impacting that person's productivity. In addition, the local model module 205 may maintain values representing a synthesized estimate of a variable (for example, temperature). In another embodiment, the local model module 205 may maintain synthesized variables representing, say, comfort, which are a function of a combination of other synthesized variables including, but not limited to, temperature, humidity, amount of light, light color, and time of day.

In one embodiment, the descriptors comprise one or more coefficients and an offset associated with a linear device on-state equation and one or more coefficients and intercept associated with a linear device off-state equation. Other equation types are contemplated as well to include second order equations, complex coefficients, or lookup tables in the absence of equation-based models. What is significant is that the local model module generates and maintains an acceptable description of its local environment that is relative to a synchronization event such that the global model module 206 can predict the local environment as seen by the local model module.

The global model module 206 receives the local descriptors via LME 212 and stores this data, along with all other environments that are broadcast over the DCN and received via the INM 211. In addition, the global model module adjusts its corresponding local environment entry to take into account sensor data from global sensors (e.g., occupancy sensors, solar radiation sensors) which is received over the DCN 204 and provided via the INM 211. An updated local entry in the global model module 206 is thus broadcast over the DCN 204 to all other control nodes in the system and is additionally fed back to the local model module to enable the local model module to adjust its local model to account for the presence of global sensor data.

The global model module 206 provides all global model entries to the global schedule module 207 via GRRE 213. The global schedule module 207 employs these models to determine when and how long to actuate each of the devices in the system. In developing a global device schedule, the global schedule module utilizes the data provided via GRRE 213, that is, aggregate adjusted local models for the system, along with system configuration data as described above which is resident at installation or which is provided via a broadcast over the DCN 204 (i.e., a NOC-initiated message over the gateway node). The global device actuation schedule refers to a schedule of operation relative to the synchronization event and is broadcast over the DCN 204 to all other control nodes. In addition, the device actuation schedule associated with the specific control node 200 is provided over LRRE 214 to both the local schedule module 208 and the local model module, for this data directs if and when the device associated with the specific control node 200 will run. It is noted that the global schedule module 207 operates substantially to reduce peak demand of the system by advancing or deferring device start times and increasing or decreasing device duty cycles in accordance with device priorities. The value by which a time is advanced or deferred and the amount of increase or decrease to a duty cycle is determined by the global schedule module 207 such that higher priority devices are not allowed to operate outside of their configured operational margin. In addition, priorities, in one embodiment, are dynamically assigned by the global schedule module 207 based upon the effect of the device's timing when turned on. Other mechanisms are contemplated as well for dynamically assigning device priority within the system.

The local schedule module 208 directs the associated device to turn on and turn off at the appropriate time via commands over RUN CTRL 210, which are processed by the node processor 201 and provided to the device control via DSB 203.

Figure 3:
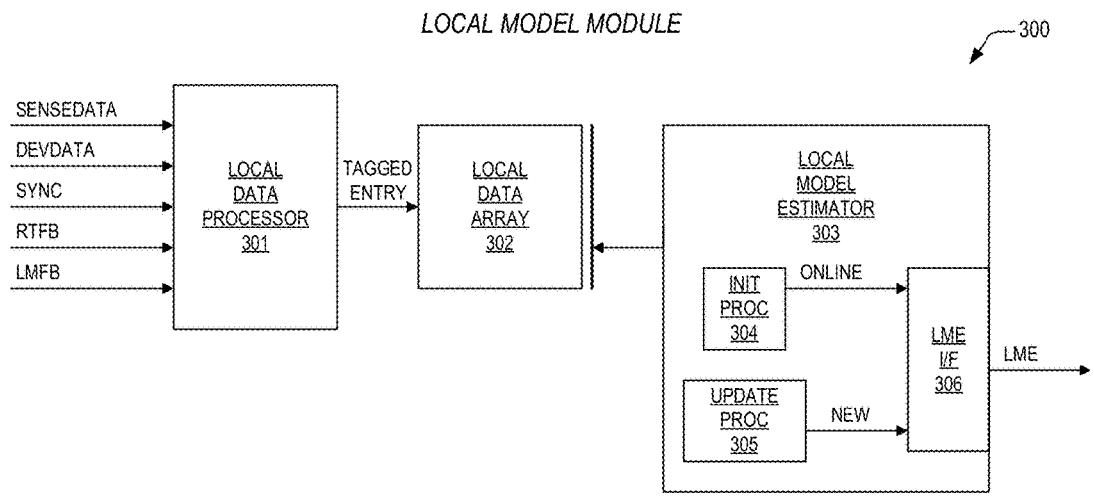
FIG. 3 is a block diagram featuring a local model module according to the present invention, such as might be disposed within the control node of FIG. 2.

Now referring to FIG. 3, a block diagram is presented featuring a local model module 300 according to the present invention, such as might be disposed within the control node 200 of FIG. 2. As is described above with reference to FIG. 2, the local model module 300 performs the function of developing, updating, and maintaining an acceptably accurate model of the local environment. Accordingly, the local model module 300 includes a local data processor 301 that is coupled to busses SENSEDATA, DEVDATA, SYNC, and RTFB. Data associated with the local environment is stamped relative to the synchronization data provided via SYNC and entries are provided to a local data array 302 via a tagged entry bus TAGGED ENTRY. The local model module 300 also includes a local model estimator 303 that is coupled to the local data array 302 and which reads the tagged entries and develops the descriptors for the local environment when the device is on an when the device is off, as described above. The local model estimator 303 include an initiation processor 304 that is coupled to an LME interface 306 via bus ONLINE and an update processor 305 that is coupled to the LME interface 306 via bus NEW. The LME interface 306 generates data for the LME bus.

In operation, the local data processor 301 monitors SENSEDATA, DEVDATA, and RTFB. If data on any of the busses changes, then the local data processor 301 creates a tagged entry utilizing time relative to data provided via SYNC and places the new tagged entry into the local data array 302. Periodically, the local model estimator 303 examines the entries in the local data array 302 and develops the descriptors described above. The period at which this operation is performed is a function of the type of devices in the system. In one embodiment, development of local environment model descriptors is performed at intervals ranging from 1 second to 10 minutes, although one skilled in the art will appreciate that determination of a specific evaluation interval time is a function of device type, number of devices, and surrounding environment. The update processor 305 monitors successive evaluations to determine if the value of one or more of the descriptors changes as a result of the evaluation. If so, then the update processor 305 provides the new set of descriptors to the LME interface 306 via bus NEW.

The initialization processor 304 monitors the accuracy of the modeled local environment as compared to the real local environment. If the accuracy exceeds an acceptable error margin, then the initialization processor 304 indicates such via bus ONLINE and the LME interface 306 reports this event to the global model module (not shown) via bus LME. As a result, the local device may be directed to operate in fail safe mode subject to constraints and configuration data considered by the global schedule module (not shown). In another embodiment, if the error margin is exceeded, the local device may not necessarily be directed to operate in fail safe mode. Rather, exceeding the error margin may only be used as an indicator that the actual conditions and the modeled view of those conditions are sufficiently disparate such that a process is triggered to develop a new equation, algorithm or model component that better describes the actual environment. Explained another way, the error margin triggers an iterative process that refines the model. Stated differently, as the model correlates more closely to actual conditions, the process runs less frequently, and model updates occur (locally and remotely) less frequently. Advantageously, the initialization processor 304 enables a control node according to the present invention to be placed in service without any specific installation steps. That is, the control node is self-installing. In one embodiment, as the local model module learns of the local environment, the initialization processor 304 indicates that the error margin is exceeded and as a result the local device will be operated in fail safe mode, that is, it will not be demand controlled by the system. And when development of the local model falls within the error margin, the initialization processor 304 will indicate such and the local device will be placed online and its start times and durations will be accordingly advanced or deferred and its duty cycle will be increased or decreased, in conjunction with other system devices to achieve the desired level of peak demand control.

Figure 4:
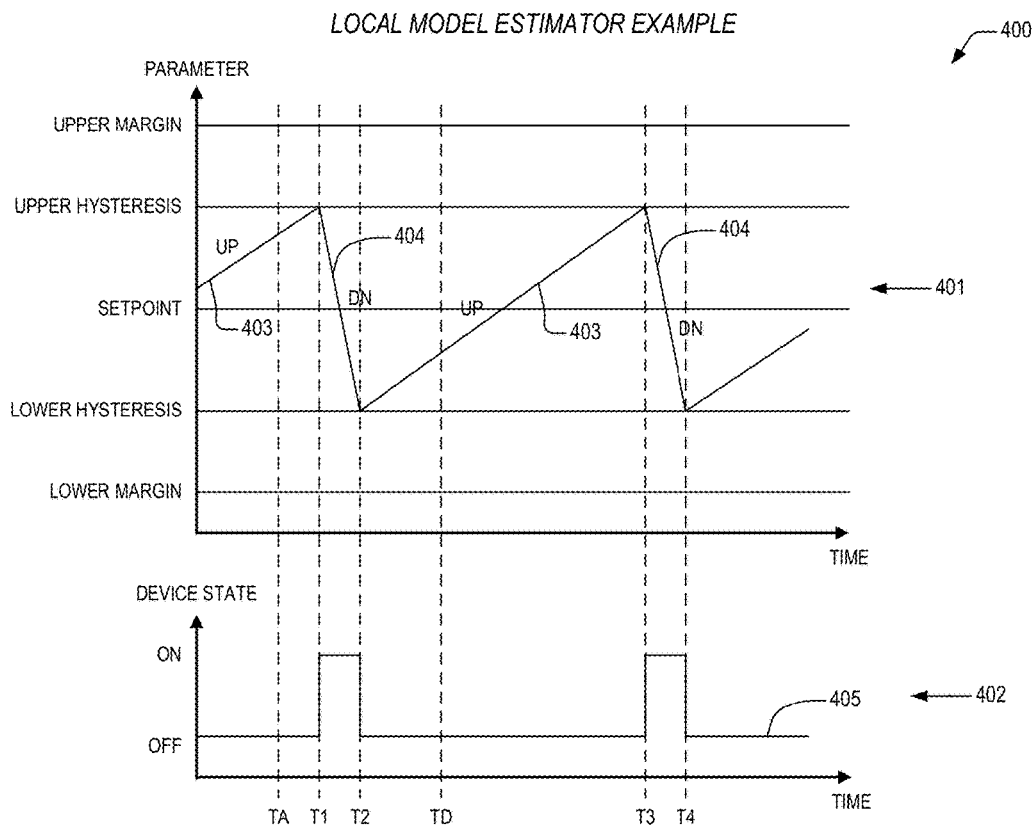
FIG. 4 is a timing diagram showing an exemplary local model estimation performed by the local model module of FIG. 3.

Turning to FIG. 4, a timing diagram 400 is presented showing an exemplary local model estimation performed by the local model module of FIG. 3. The diagram 400 includes two sections: a parameter estimation section 401 and a device state section 402. The parameter estimation section 401 shows a setpoint for the device along with upper and lower hysteresis values. In some devices, hysteresis is related to the accuracy of the local sensor. In other devices, hysteresis is purposely built in to preclude power cycling, throttling, oscillation, and the like. In a cooling or heating unit, the hysteresis determines how often the device will run and for how long. The parameter estimation section 401 also shows an upper operational margin and a lower operational margin, outside of which the local device is not desired to operate. The parameter estimation section 401 depicts an estimated device off line (UP) 403 that is the result of applying estimated descriptors over time for when the device is turned off, and an estimated device on line (DN) 404 that is the result of applying estimated descriptors over time for when the device is turned on. One area of demand control where this example is applicable is for a local air conditioning unit that is controlled by a local thermostat. Accordingly, the local data processor 301 provides tagged entries to the local data array 302 as noted above. Device status (on or off) is provided either directly from DEVDATA bus or indirectly from RTFB (if DEVDATA is incapable of determining on and off state). The entries corresponding to each of the two states are evaluated and a set of descriptors (i.e., parameters) are developed that describe the local environment. In one embodiment, a linear fit algorithm is employed for the on time and off time of the device. By using device status 405, the local model estimator 303 can determine descriptors for UP 403, DN 404, and the upper and lower hysteresis levels. Upper and lower margin levels are typically provided as configuration data and may vary from installation to installation. In the air conditioning example, the parameter being estimated is local temperature and thus the upper and lower margins would vary perhaps two degrees above and below the hysteresis levels. Note that prior to time T1, the device is off and the parameter, as indicated by local sensor data, is increasing. At time T1 the device turns on, subsequently decreasing the parameter. At time T2, the device turns off and the parameter begins increasing in value. At time T3 the device turns on again and the parameter decreases. At time T4, the device turns off and the parameter increases.

By determining the descriptors and knowing the upper and lower margins, a global scheduler is enabled to determine how long it can advance (point TA) or delay (point TD) a start time, for example. In addition, the descriptors developed by the local model for the operational curves 403, 404, as adjusted by the global model module, enable a global scheduler to advance or defer start and/or duration, or increase or decrease duty cycle of the device in a subsequent cycle in order to achieve the desired peak demand control while maintaining operation of the device within the upper and lower margin boundaries. Advantageously, the model according to the present invention is configured to allow for estimation of the precise position in time of the device on the curves 403, 404, which enables, among other features, the ability of the system to perform dynamic hysteresis modification, or overriding intrinsic hysteresis of a device. In addition, the initialization processor 304 can monitor the actual environment from local sensor data and compare it to the curves 403, 404 to determine if and when to place the device online for demand control. The descriptors that describe the UP segment 403 and DN segment 404 are communicated to the global model module via bus LME.

Figure 5:
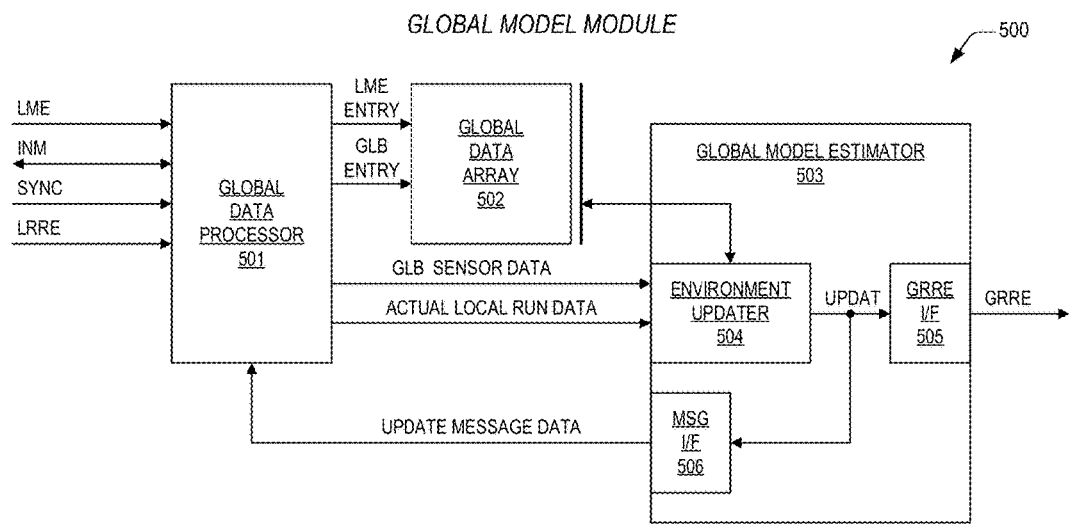
FIG. 5 is a block diagram illustrating a global model module according to the present invention, such as might be disposed within the control node of FIG. 2.

Now referring to FIG. 5, a block diagram illustrating a global model module 500 according to the present invention, such as might be disposed within the control node 200 of FIG. 2. As is noted in the discussion with reference to FIG. 2, the global model module 500 performs two functions. First, the global model module 500 adjusts the descriptors associated with the local environment as provided over bus LME to account for global sensor data provided via messages broadcast for global sensor nodes over the demand control network. Secondly, the global model module stores replica copies of all other local environment descriptors in the system, as each of those local environment descriptors have been adjusted by their respective global model modules.

The global model module 500 includes a global data processor 501 that receives local descriptors and other data via bus LME from its corresponding local model module. In addition, the global data processor 501 interfaces to busses INM, SYNC, and LRRE to receive/transmit data as described above. Local descriptors are stamped and entered into a global data array 502 via bus LME entry. The remaining adjusted local descriptors from other devices are received via bus INM and are entered into the global data array 502 via bus GLB entry.

A global model estimator 503 is coupled to the global data array 502 and to the global data processor 501 via busses GLB SENSOR DATA, ACTUAL LOCAL RUN DATA, and UPDATE MESSAGE DATA. Global sensor data that is received over INM is provided to the estimator 503 via GLB SENSOR DATA. Actual run time data for the corresponding local device that is received over bus LRRE is provided to the estimator 503 via ACTUAL LOCAL RUN DATA.

In operation, the global model estimator 503 retrieves its corresponding local environment descriptor entry from the global data array 502. The global model estimator 503 includes an environment updater 504 that modifies the local descriptor retrieved from the array to incorporate the effects of global sensor data provided over GLB SENSOR DATA. For example, the value of an external building temperature sensor is a parameter that would affect every local temperature descriptor set in the system. The environment updater 504 modifies its local descriptor set to incorporate any required changes due to global sensor values. In addition, the environment updater 504 employs the actual run data of the associated device to enable it to precisely determine at what point on the estimated local environmental curve that it is at when modifying the local descriptors.

If the environment updater 504 modifies a local descriptor set, its corresponding entry in the array 502 is updated and is provided to a messaging interface 506 and to a GRRE interface. The messaging interface 506 configures update message data and provides this data via UPDATE MESSAGE DATA to the processor 501 for subsequent transmission over the DCN. The GRRE interface 505 provides the updated local environment descriptor set to bus GRRE. All operations are performed relative to synchronization event data provided via SYNC.

Figure 6:
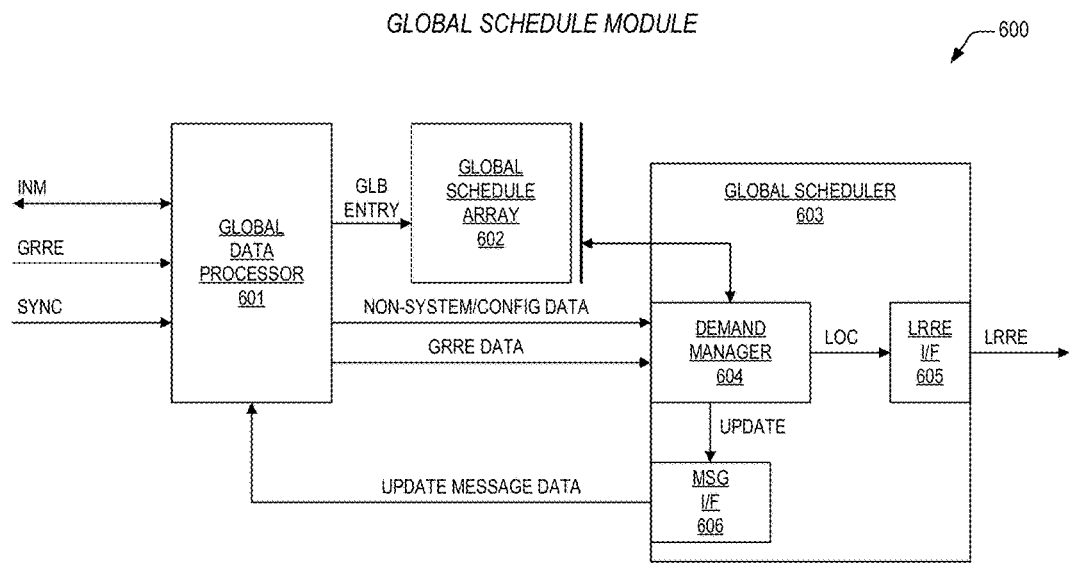
FIG. 6 is a block diagram detailing a global schedule module according to the present invention, such as might be disposed within the control node of FIG. 2.

Turning to FIG. 6, a block diagram is presented detailing a global schedule module 600 according to the present invention, such as might be disposed within the control node 200 of FIG. 2. As described above, the global schedule module 600 is responsible for determining a schedule of operation (turn on, duration, and duty cycle) for each of the devices in the system. When the local environment descriptors are updated by a coupled global model module and are received over bus GRRE, then the global schedule module 600 operates to revise the global schedule of device operation and to broadcast this updated schedule over the DCN.

The global schedule module 600 includes a global data processor 601 that interfaces to INM for reception/transmission of DCN related data, bus GRRE for reception of updated local environment descriptors, and bus SYNC for reception of synchronization event data. DCN data that is provided to the global schedule module 600 includes broadcast global schedules from other control nodes, and non-system device data and configuration data as described above. The global data processor 601 provides updated global schedule data, received over the DCN from the other control nodes, to a global schedule array 602 via bus GLB ENTRY. The global processor 601 is coupled to a global scheduler 603 via bus NON-SYSTEM/CONFIG DATA for transmittal of the non-system device data and configuration data. The global processor 601 is also coupled to the global scheduler 603 via bus GRRE data for transmittal of updated local environment descriptors provided via bus GRRE. And the global scheduler 603 is coupled to the processor 601 via bus UPDATE MESSAGE DATA to provide INM data resulting in DCN messages that broadcast an updated global schedule generated by this module 600 to other control nodes in the system.

The global scheduler 603 includes a demand manager 604 that is coupled to an LRRE interface 605 via bus LOC and to a messaging interface 606 via bus UPDATE. When data is received over either the NON-SYSTEM/CONFIG DATA bus or the GRRE data bus, the demand manager recalculates a global relative run schedule for all devices in the system. The schedule for an individual device includes, but is not limited to, a relative start time, a duration, and a duty cycle. The relative start time and/or duration may be advanced, maintained, or deferred in order to achieve configured constraints of the system in conjunction with the operation of non-system devices and the amount of resource that they consume. In addition, for similar purposes the duty cycle for each device in the system may be increased or decreased. Yet, as one skilled will appreciate, the system accounts for limits to devices duty cycle modification to prevent unintended damage to a device. The result is an updated global schedule, which is stored in the array 602, and which is broadcast via update messages over the DCN provided via bus UPDATE. In addition, the relative run schedule for the corresponding local device is provided via bus LOC to the LRRE interface 605, and which is placed on bus LRRE for transmission to a corresponding local schedule module.

Figure 7:
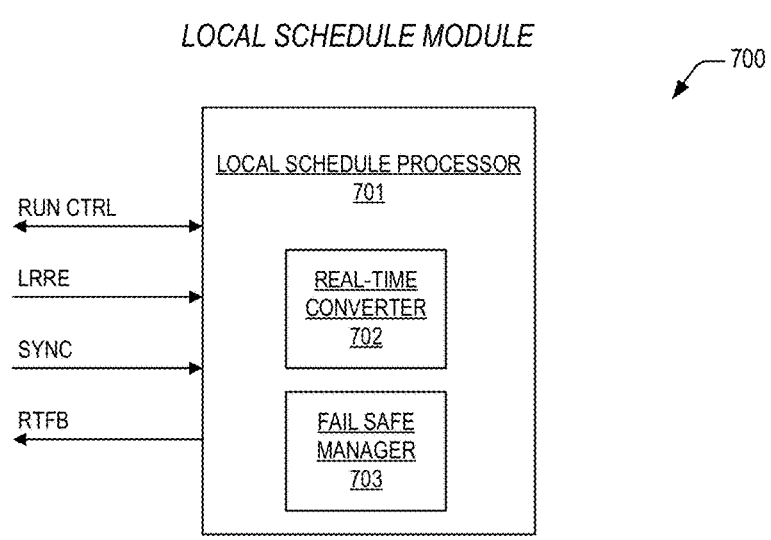
FIG. 7 is a block diagram showing a local schedule module according to the present invention, such as might be disposed within the control node of FIG. 2.

FIG. 7 is a block diagram showing a local schedule module 700 according to the present invention, such as might be disposed within the control node 200 of FIG. 2. The local schedule module 700 includes a local schedule processor 701 that is coupled to bus RUN CTRL, bus LRRE, bus SYNC, and bus RTFB. The local schedule processor 701 includes a real-time converter 702 and a fail safe manager 703.

In operation, the local schedule processor 701 receives an updated local run schedule for its associated device. The real-time converter establishes an actual run time for the device based upon the synchronization data provided via SYNC and the relative run time data received over LRRE. This real-time data is provided to a corresponding local model module via bus RTFB to enable the local model module to establish device on/off times in the absence of the device's ability to provide that data itself. Accordingly, the processor 701 directs the device to turn on and turn off via commands over RUN CTRL in comport with the actual run time schedule. In the event that the LRRE includes an indication that the local model is not within an acceptable error range, as described above, the fail safe manager 703 directs the device via RUN CTRL to operate independently.

Figure 8:
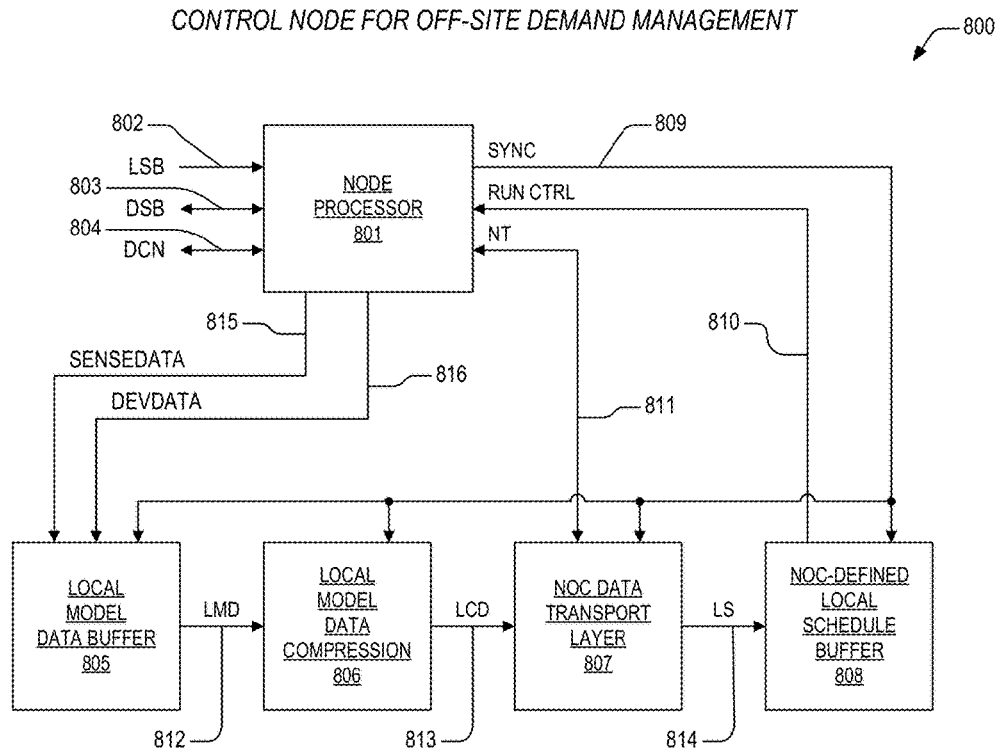
FIG. 8 is a block diagram depicting an alternative embodiment of a control node according to the present invention for use in a NOC-oriented demand coordination system.

Turning now to FIG. 8, a block diagram is presented depicting an alternative embodiment of a control node 800 according to the present invention. The control node 800 may be employed in a configuration of the system of FIG. 1 where algorithms associated with demand management and coordination are performed off-site, that is, by a NOC 121 that is configured to execute all of the modeling and scheduling functions associated with each of the control nodes 103 in the demand coordination system 100, taking into account data provided via the sensor nodes 106 and monitor nodes 109. Accordingly, such a configured control node 800 provides a reduced cost alternative for demand coordination over the control node 200 of FIG. 2 as a result of elimination of processing and storage capabilities that are shifted to the NOC 121.

As is described above with reference to FIGS. 1-2, each of the control nodes 103, 200 in the network retain forms of the global model that describe the entire system 100, and local schedules are generated in-situ on each node 103, 200 by a local schedule module 208. In this cost-reduced embodiment, the control nodes 800 only store their corresponding local schedules that have been generated by the NOC 121. Since these nodes 800 have a greater dependency on network availability, they execute an algorithm that selects an appropriate pre-calculated schedule, based on network availability. Accordingly, the control nodes 800 according to the NOC-oriented embodiment are configured to maintain operation of the system 100 during network disruptions. The algorithm utilizes a set of pre-calculated schedules along with network integrity judgment criteria used to select one of the pre-calculated schedules. The pre-calculated schedules and judgment criteria are sent to each node 800 from the NOC 121. The pre-calculated schedules for the device associated with the control node 800 are based on the latency of last communication with the NOC 121. As the latency increases, increased latency is used as an index to select an alternate schedule. This latency-indexed scheduling mechanism is configured to ensure demand-coordinated operation of the devices 101 within the system 100 even if the communication network (e.g., WAN and/or LAN) is interrupted, thus improving disruption tolerance of the overall system 100.

In lieu of processing global and local models within the system 100, a control node 800 according the NOC-oriented embodiment is configured to forward all data necessary for performing these processing operations to the NOC 121. The NOC 121 performs this processing for each of the control nodes 800 in the system 100, and the resultant local schedules are then transmitted to the control nodes 800 within the system 100 so that the demand coordination operations can continue. By reorienting the system 100 to utilize remote storage and processing disposed within the NOC 121, additional demands may be placed on the communication network utilized by the control nodes 800 within the facility, as well as any necessary LAN or WAN network needed to communication with the remote storage and processing facility. To accommodate this increased utilization of the communication network, the control nodes are configured to compress the local data that is transmitted to the NOC 121.

The control node 800 includes a node processor 801 that is coupled to one or more local sensors (not shown) via a local sensor bus (LSB) 802, a device control (not shown) via a device sense bus (DSB) 803, and to a demand coordination network (DCN) 804 as has been described above with reference to FIG. 1.

The control node 800 also includes a local model data buffer 805 that is coupled to the node processor 801 via a synchronization bus (SYNC) 809, a sensor data bus (SENSEDATA) 815, and a device data bus (DEVDATA) 816. The control node 800 also has local model data compression 806 that is coupled to the node processor 801 via SYNC 809. The local model data compression 806 is coupled to the local model data buffer 805 via a local model data (LMD) bus 812. The control node 800 further includes a NOC data transport layer 807 that is coupled to the node processor 201 via SYNC 809 and a NOC transport bus (NT) 811, and that is coupled to the local model data compression 806 via a local compressed data (LCD) bus 813. The control node 800 finally includes a NOC-defined local schedule buffer 808 that is coupled to the node processor 801 via SYNC 809 and a run control bus (RUN CTRL) 810. The local schedule buffer 808 is coupled to the transport layer 807 via a local schedule (LS) bus 814.

The control node 800 according to the present invention is configured to perform the operations and functions as will be described in further detail below. The control node 800 comprises logic, circuits, devices, or microcode (i.e., micro instructions or native instructions), or a combination of logic, circuits, devices, or microcode, or equivalent elements that are employed to perform the operations and functions described below. The elements employed to perform these operations and functions may be shared with other circuits, microcode, etc., that are employed to perform other functions within the control node 800.

In operation, synchronization information is received by the node processor 201. In one embodiment, the synchronization information is time of day data that is broadcast over the DCN 804. In an alternative embodiment, a synchronization data receiver (not shown) is disposed within the node processor 801 itself and the synchronization data includes, but is not limited to, atomic clock broadcasts, a receivable periodic synchronization pulse such as an amplitude modulated electromagnetic pulse, and the like. The node processor 801 is further configured to determine and track relative time for purposes of tagging events and the like based upon reception of the synchronization data. Preferably, time of day is employed, but such is not necessary for operation of the system.

The node processor 801 provides periodic synchronization data via SYNC 809 to each of the modules 805-808 to enable the modules 805-808 to coordinate operation and to mark input and output data accordingly. The node processor 801 also periodically monitors data provided by the local sensors via LSB 802 and provides this data to the local model data buffer 805 via SENSEDATA 815. The node processor 801 also monitors the DSB 803 to determine when an associated device (not shown) is turned on or turned off. Device status is provided to the local model data buffer 805 via DEVDATA 816. The node processor 801 also controls the associated device via the DSB 803 as is directed via commands over bus RUN CTRL 810. The node processor 801 further transmits and receives network messages over the DCN 804. Received message data is provided to the NOC transport layer 807 via NT 811.

Periodically, in coordination with data provided via SYNC 809, the local model data buffer 805 buffers sensor data provided via SENSEDATA 815 in conjunction with device actuation data provided via DEVDATA 816 and provides this buffered data periodically to the data compression 806 via LMD 812. The data compression 806 compresses the buffered data according to known compression mechanisms and provides this compressed data to the transport layer 807 via LCD 813. The transport layer 807 configures packets for transmission to the NOC 121 and provides these packets to the node processor 801 via NT 811. The node processor 801 transmits the packets to the NOC 121 over the DCN 804.

One or more compressed local schedules along with latency-based selection criteria are received from the NOC 121 via packets over the DCN 804 and are provided to the transport layer 807 over NT 811. The one or more local schedules and selection criteria are decompressed by the transport layer 807 according to known mechanisms and are provided to the local schedule buffer 808 via LS 814. As a function of transport latency to/from the NOC 122, the local schedule buffer 808 selects one or the one or more local schedules and directs the associated device to turn on and turn off at the appropriate times via commands over RUN CTRL 810, which are processed by the node processor 801 and provided to the device control via DSB 803.

Figure 9:
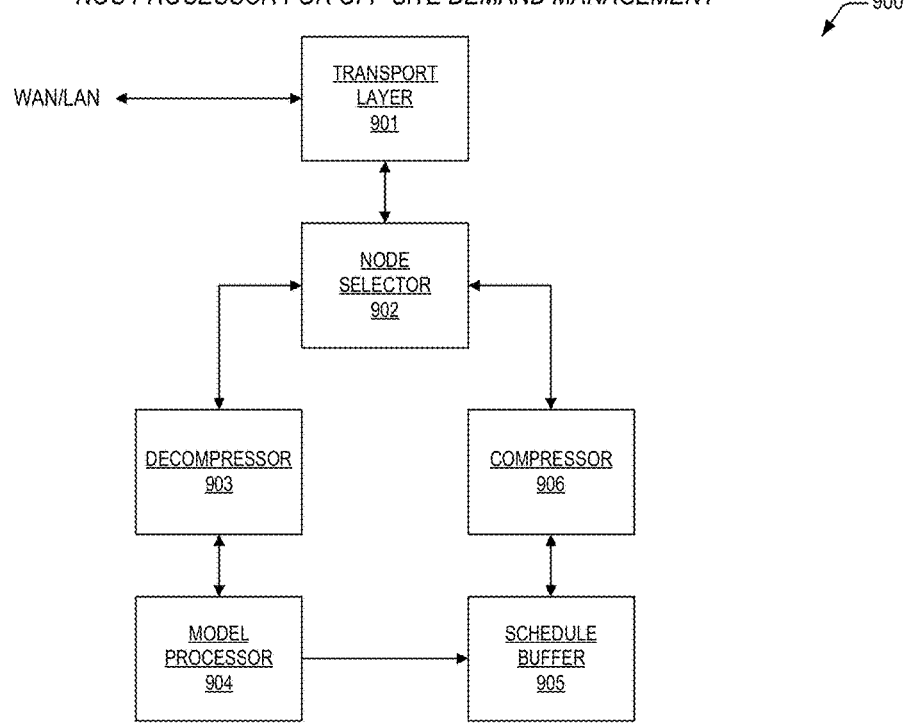
FIG. 9 is a block diagram illustrating a NOC processor for off-site demand management.

Now turning to FIG. 9, a block diagram is presented illustrating a NOC processor 900 for off-site demand management. The NOC processor 900 may be employed in a system along with control nodes 800 as discussed above with reference to FIG. 8 where all of the processing associated with the generation and maintenance of local device models and global system models is performed exclusively by the NOC. In addition to model generation and maintenance, the NOC generates one or more latency-based local schedules for each device in the system and transmits those schedules to the devices over a WAN or LAN as is discussed with reference to FIG. 1 and FIG. 8. For clarity sake, only elements essential to an understanding of the present invention are depicted.

The processor 900 may include a transport layer 901 that is coupled to the WAN/LAN. The transport layer 901 is coupled to a node selector 902. A decompressor 903 is coupled to the node selector 902 and to a model processor 904. The model processor 904 is coupled to a schedule buffer 905, which is coupled to a compressor 906. The compressor 906 is coupled to the node selector.

In operation, compressed local model data for each device in the system is received via packets transmitted over the WAN/LAN. The transport layer 901 receives the packets and provides the data to the node selector 902. The node selector 902 determines an identification for a control node 800 which provided the data and provides the data to the decompressor 903. The node selector 902, based on the identification of the control node 800, also selects a representation model (e.g., air conditioning, heating, etc.) for the data and provides this to the decompressor 903.

The decompressor 903 decompresses the data and provides the decompressed data, along with the representation model, to the model processor 904. The model processor performs all of local and global modeling functions for each of the system devices in aggregate, as is discussed above with reference to the local model module 205, global model module 206, global schedule module 207 and local schedule module 208 of FIG. 2, with the exception that the model processor 904 generates one or more local schedules for each device along with selection criteria which is based upon network latency.

The one or more local schedules and selection criteria are provided by the model processor 904 to the schedule buffer 905. In one embodiment, the schedule buffer 905 provides schedules in order of device priority to the compressor 906. The compressor 906 compresses schedules and selection criteria for transmission over the WAN/LAN and the compressed schedules and selection criteria are sent to the node selector 902. The node selector 902 identifies the target node and provides this indication to the transport layer 901 along with the data. The transport layer 901 formats and transmits the data in the form of packets over the WAN/LAN for reception by the demand coordination network and ultimate distribution to the target node.

Figure 10:
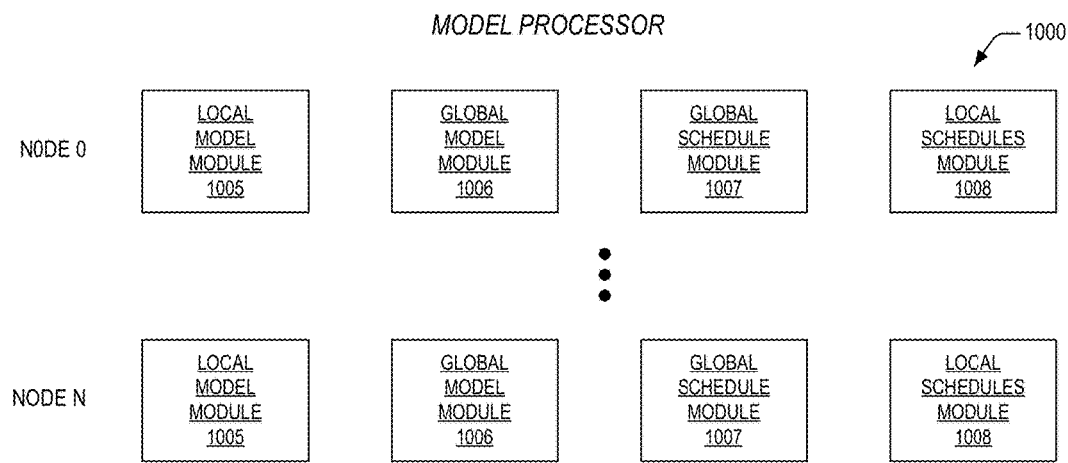
FIG. 10 is a block diagram detailing a model processor for employment within the NOC processor of FIG. 9.

Referring now to FIG. 10, a block diagram is presented illustrating elements of a model processor 1000 according to the present invention, such as may be employed in the NOC processor 900 of FIG. 9. The model processor 1000 includes one or more sets of local model modules 1005, global model modules 1006, global schedule modules 1007, and local schedules modules 1008 for each of N nodes in the system. As noted above with reference to FIG. 9, in operation these modules 1005-1008 perform substantially similar functions as the like-named modules 205-208 of FIG. 2, with the exception that the local schedules modules 1008 generate one or more local schedules for each device along with selection criteria which is based upon network latency.

As noted with reference the FIG. 1, the system 100 may optionally include one or more non-system devices 107, each having associated device control 108 that is coupled to a respective monitor node 109 via a non-system bus (NSB) 114. The monitor node 109 monitors the state of its respective non-system device 107 via its device control 108 to determine whether the non-system device 107 is consuming the managed resource (i.e., turned on) or not (i.e., turned off). Changes to the status of each non-system device 107 are broadcast by its respective monitor node 109 over the DCN 110 to the control nodes 103 and consumption of the resource by these non-system devices 107 is employed as a factor during scheduling of the system devices 101 in order to manage and control peak demand of the resource. The following discussion is directed towards an embodiment of the present invention where there are additionally one or more non-system devices 107 deployed that do not have a corresponding device control 108 and a corresponding monitor node 109. The embodiment that follows is provided to enable either passive or active monitoring of consumption of a given resource by these non-system devices 107 to enable more effective demand coordination of the system 100.

Figure 11:
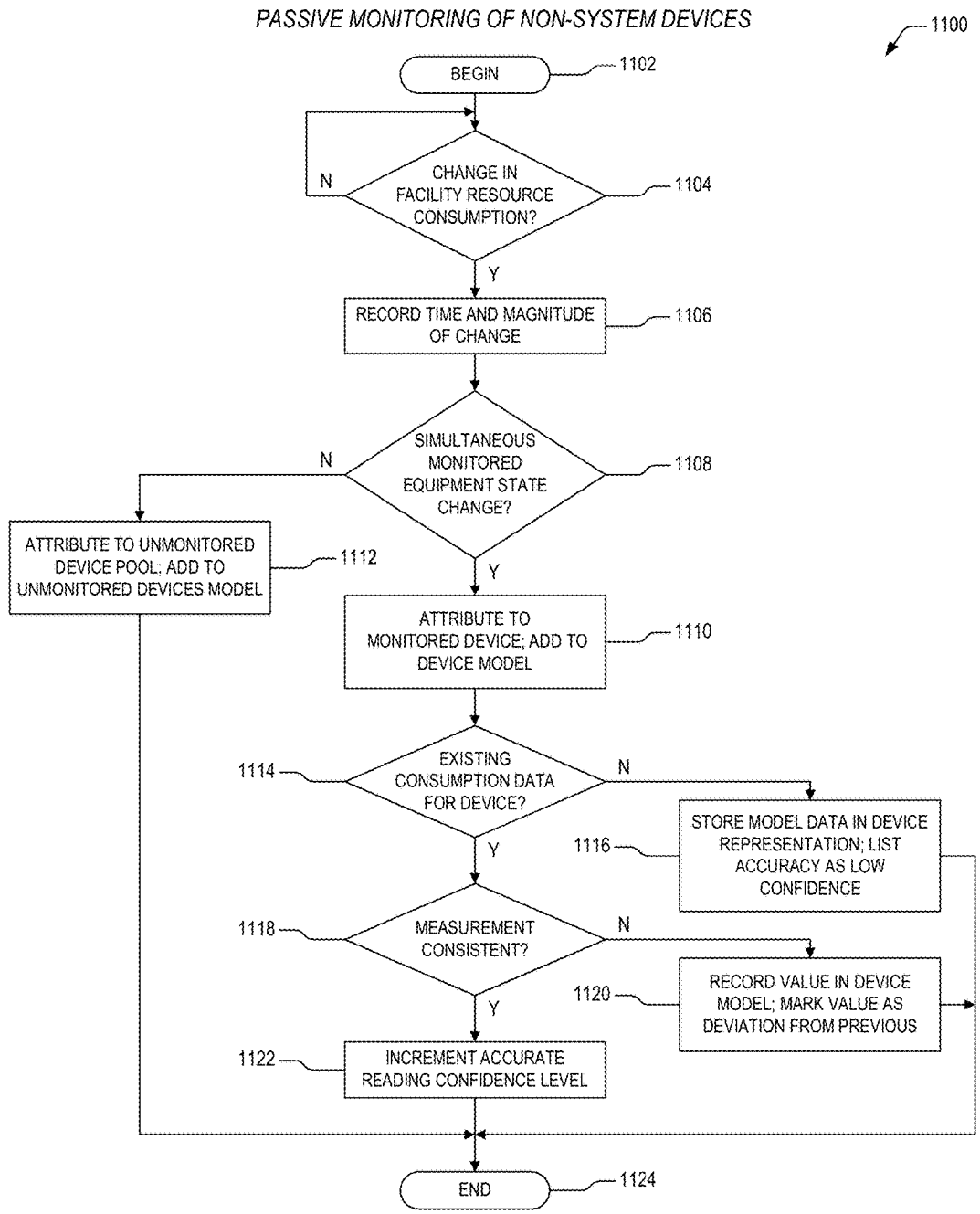
FIG. 11 is a flow chart showing how the demand management system of FIG. 1 may be employed to passively monitor and model non-system devices that are not coupled to the demand management network.

Turning now to FIG. 11, a flow diagram 1100 is presented that features a method for passively modeling one or more non-system devices 107 that do not include corresponding device controls 108 and monitor nodes 109. The modeling is enabled via a facility consumption monitoring device (e.g., a power meter) that provides an accurate and substantially real time value for consumption of a resource (e.g., electricity). To affect the method discussed below, the facility consumption monitoring device is configured as a non-system device 107 that is coupled to a corresponding monitor node 109. The non-system device is 107 is not required to comprise a corresponding device control 108.

At a summary level, the operation of known, monitored devices 101, 107 is utilized by the network 100 to control demand within the facility, as is discussed above. However, the embodiment of FIG. 11 enables capabilities of the demand coordination network 100 to improve demand coordination by inferring consumption of the resource by non-system, unmonitored devices that cannot be directly measured and utilizing the inferred consumption in the global model of the system 100. By accessing total facility consumption at, say, a power meter, a model is built of these non-monitored, non-system devices within a facility. The model may include probabilistic information of the time and magnitude of energy used by those devices. This information my then be utilized by the global model and scheduler on each controlled device 101 to further refine the ability of the network to control total energy demand of a facility. By modeling the operation and consumption patterns of monitored and controlled devices, and by knowing the total consumption within the facility, the demand management system 100 is able to perform a subtractions of known energy consumers from the total consumption, resulting in a value that represents unmonitored and uncontrolled consumption. By modeling this "unmonitored consumption" value, the system is able to more effectively manage total energy demand within a facility.

Flow begins at block 1102, where a system configuration 100 according to FIG. 1 includes a facility resource monitoring device that is configured as a non-system device 107 that is coupled to a monitoring node 109. The system also includes one or more control nodes 103, 200 that are configured to function as described above, and to additionally perform the functions described below for passive monitoring of non-system, non-monitored devices. Flow then proceeds to decision block 1104.

At block 1104, the control nodes 103, 200 via information provided over the DCN 110 from the monitor node 109 coupled to the facility resource meter, determine whether there is a change in facility resource consumption. If not, then flow proceeds to block 1104, and monitoring for change continues. If so, then flow proceeds to block 1106.

At block 1106, the nodes 103, 200 record the time and magnitude of the change in resource consumption. Flow then proceeds to decision block 1108.

At decision block 1108, the control nodes evaluate the global model to determine if the change in resource consumption coincided with a change of state in monitored equipment, that is, in system devices 101. If so, then flow proceeds to block 1110. If not, then flow proceeds to block 1112.

At block 1112, the change in resource consumption is attributed to a pool of non-system, non-monitored devices within the global model. Flow then proceeds to block 1124.

At block 1110, the change in resource consumption is attributed to the system device 101 whose state change coincided with the change in resource consumption, and the local device model and global model are updated to reflect the consumption reading. Flow then proceeds to decision block 1114.

At decision block 1114, an evaluation is made to determine if the local device model comprises existing consumption data for the device. If so, then flow proceeds to decision block 1118. If not, then flow proceeds to block 1116.

At block 1116, the device's local model (and system global model) are updated to store the resource consumption that was detected. The accuracy of the reading is marked as a low confidence reading. Flow then proceeds to block 1124.

At decision block 1118, the control node 103, 200 determines whether the resource consumption measurement obtained is consistent with the existing consumption data. If so, then flow proceeds to block 1122. If not, then flow proceeds to block 1120.

At block 1122, the control node 103, 200 increases the confidence level of resource consumption for the device in its local model (and resulting global model). Flow then proceeds to block 1124.

At block 1120, the measurement is updated in the local model for the device and it is marked as a deviation from previous readings. Flow then proceeds to block 1124.

At block 1124, the method completes.

Figure 12:
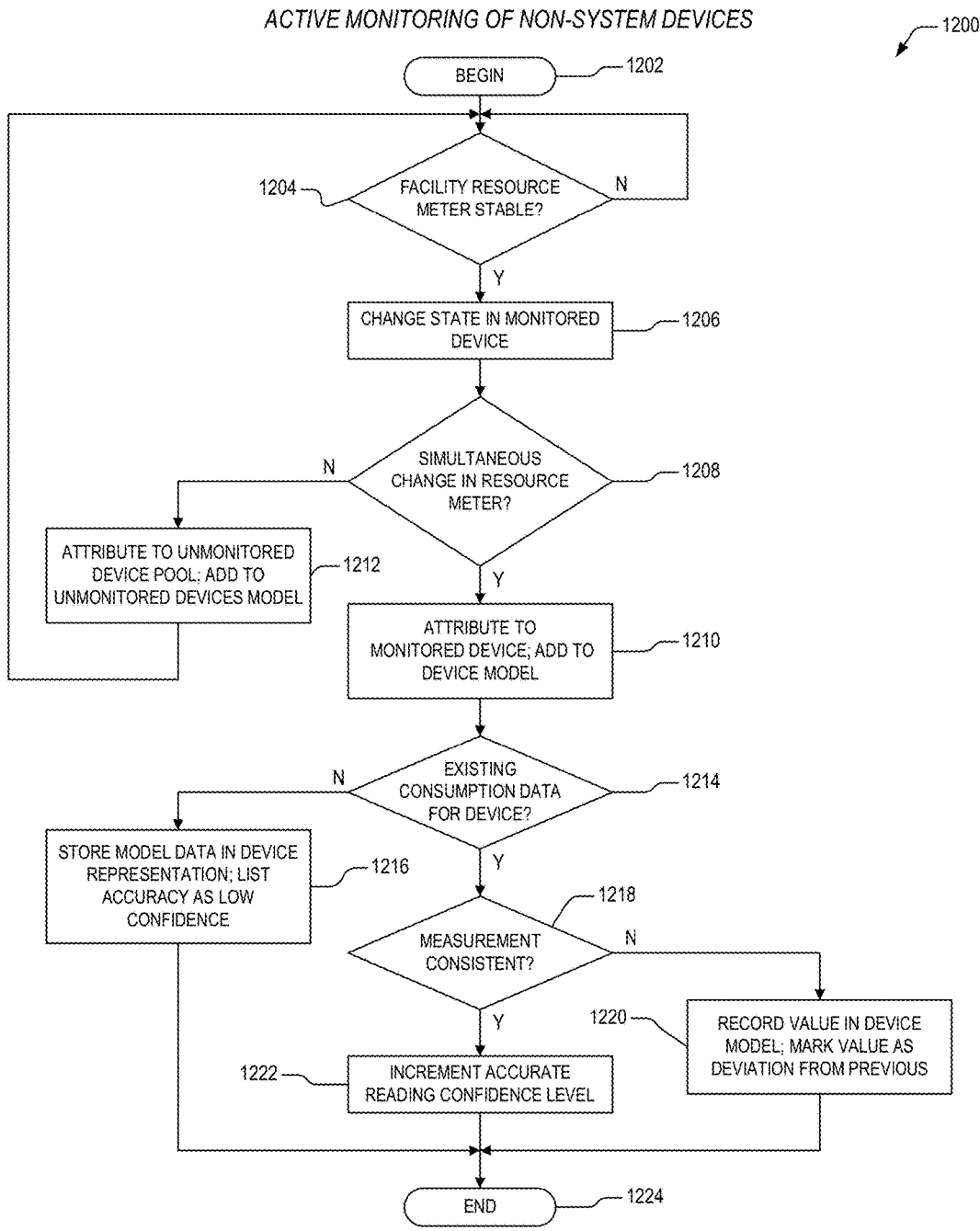
FIG. 12 is a flow chart depicting how the demand management system of FIG. 1 may be employed to actively monitor and model non-system devices that are not coupled to the demand management network.

Referring now to FIG. 12, a flow diagram 1200 is presented that features a method for actively modeling one or more non-system devices 107 that do not include corresponding device controls 108 and monitor nodes 109. Like the passive method of FIG. 11, the method according to an active modeling embodiment is enabled via a facility consumption monitoring device (e.g., a power meter) that provides an accurate and substantially real time value for consumption of a resource (e.g., electricity). To affect the method discussed below, the facility consumption monitoring device is configured as a non-system device 107 that is coupled to a corresponding monitor node 109. The non-system device is 107 is not required to comprise a corresponding device control 108.

At a summary level, the operation of known, monitored devices 101, 107 is utilized by the network 100 to control demand within the facility, as is discussed above. However, the embodiment of FIG. 12 enables capabilities of the demand coordination network 100 to improve demand coordination by actively changing the state of a system device 101 and then monitoring the total facility power consumption. Uncorrelated consumption of the resource by non-system, unmonitored devices that cannot be directly measured is thus inferred, and the inferred consumption is utilized in the global model of the system 100. By accessing total facility consumption at, say, a power meter, a model is built of these non-monitored, non-system devices within a facility. The model may include probabilistic information of the time and magnitude of energy used by those devices. This information my then be utilized by the global model and scheduler on each controlled device 101 to further refine the ability of the network to control total energy demand of a facility. By modeling the operation and consumption patterns of monitored and controlled devices, and by knowing the total consumption within the facility, the demand management system 100 is able to perform a subtractions of known energy consumers from the total consumption, resulting in a value that represents unmonitored and uncontrolled consumption. By modeling this "unmonitored consumption" value, the system is able to more effectively manage total energy demand within a facility.

Flow begins at block 1202, where a system configuration 100 according to FIG. 1 includes a facility resource monitoring device that is configured as a non-system device 107 that is coupled to a monitoring node 109. The system also includes one or more control nodes 103, 200 that are configured to function as described above, and to additionally perform the functions described below for active monitoring of non-system, non-monitored devices. Flow then proceeds to decision block 1204.

At decision block 1204, an evaluation is made to determine if the facility resource meter is stable. If so, then flow proceeds to block 1206. If not, then the data from the monitor node 109 corresponding to the resource meter is periodically polled until stability is sensed.

At block 1206, via a local schedule in a selected device 101, the state of the device 101 is changed. Flow them proceeds to decision block 1208.

At decision block 1208, the control nodes 103, 200 evaluate the global model to determine if the change in resource consumption coincided with a change of state in the selected system device 101. If so, then flow proceeds to block 1210. If not, then flow proceeds to block 1212.

At block 1212, the change in resource consumption is attributed to a pool of non-system, non-monitored devices within the global model. Flow then proceeds to block 1204.

At block 1210, the change in resource consumption is attributed to the system device 101 whose state change was actively forced, and the local device model and global model are updated to reflect the consumption reading. Flow then proceeds to decision block 1214.

At decision block 1214, an evaluation is made to determine if the local device model comprises existing consumption data for the device. If so, then flow proceeds to decision block 1218. If not, then flow proceeds to block 1216.

At block 1216, the device's local model (and system global model) are updated to store the resource consumption that was detected. The accuracy of the reading is marked as a low confidence reading. Flow then proceeds to block 1224.

At decision block 1218, the control node 103, 200 determines whether the resource consumption measurement obtained is consistent with the existing consumption data. If so, then flow proceeds to block 1222. If not, then flow proceeds to block 1220.

At block 1222, the control node 103, 200 increases the confidence level of resource consumption for the device in its local model (and resulting global model). Flow then proceeds to block 1224.

At block 1220, the measurement is updated in the local model for the device and it is marked as a deviation from previous readings. Flow then proceeds to block 1224.

At block 1224, the method completes.

Advantageously, according to the embodiment of FIG. 12, the present invention provides the capability to measure facility energy consumption in order to directly ascertain the energy consumption of system devices 101 without the additional expense and complexity of energy consumption measuring devices being installed on each device in the system. In some cases the magnitude of energy consumption (or generation) of those devices can be directly measured or predicted with an acceptable degree of accuracy. In other cases, however, it is desirable to know the actual energy consumed (or generated) by a device without direct measurement. By utilizing the demand coordination network 100 to ascertain the operational state of all other devices in the network, a value can be built that represents current energy consumption. The device 101 in question can then be cycled on/off periodically, and the change in consumption can be measured at a facility resource meter. The change in consumption can be temporally correlated to the controlled cycling of the device 101, and a measurement of the device can then be accurately obtained. Utilizing the ability to monitor the facility consumption, while also directly controlling the operation of controlled devices 101 allows the observation of the consumption of the controlled device 101 by changing the operational state of the controlled device 101 and observing the change in energy consumption at the meter in temporal synchronization with the device operation. The same can be achieved in monitored, non-system devices, since, although their operation can not be controlled, it can be directly observed via the monitoring device. In this way the monitored device consumption can also be ascertained.

The present invention can furthermore be extended to comprehend evaluating the operation of equipment within a facility in addition to or in place of performing demand management of a resource. The data obtained may be used to model operation of devices within the facility can also be utilized to make decisions about the relative efficiency, and changes therein, of the equipment as well as the facility. This capability builds upon the model-based demand coordination network 100 of FIG. 1 to provide additional value about the operation, efficiency, and predictive service requirements of monitored and non-monitored (synthesized) equipment. By utilizing a demand management system like that of FIG. 1 that comprises control nodes 103, 200 with additional equipment modeling features, or by creating a stand-alone system which employs a similar architecture, the empirically derived "nominal" operation of equipment within a facility is modeled and understood, as well as the "nominal" operation of the facility as a whole. The system can also monitor deviations from nominal operation, and, through access to data about the devices therein, can create a set of probable causes as well as suggesting corrective actions. The discussion with reference to FIGS. 1-7 describes the data and subsequent model for each sensor and device in the demand coordination network 100. Utilizing this model data to monitor for exceptions to nominal operation can provide insight to machine operational changes that may represent changes in operation of the equipment (e.g., changes in efficiency or equipment failures) as well as changes in the facility (e.g., air leaks and infiltration, loss of insulation due to water damage, doors or windows open, etc). These exceptions to normal operation can be programmed statically or dynamically, and can vary with respect to time. Additionally, these exceptions could also extend to the identification of security breaches within a facility (e.g., heat, lighting or AC activated by unauthorized personnel).

In one embodiment, the system 100 can utilize the architecture described above to perform the analysis, by substituting control nodes having the additional analysis capabilities. The analysis of facility and equipment performance may be performed in-situ by these control nodes, since each node comprises local and global model information.

Figure 13:
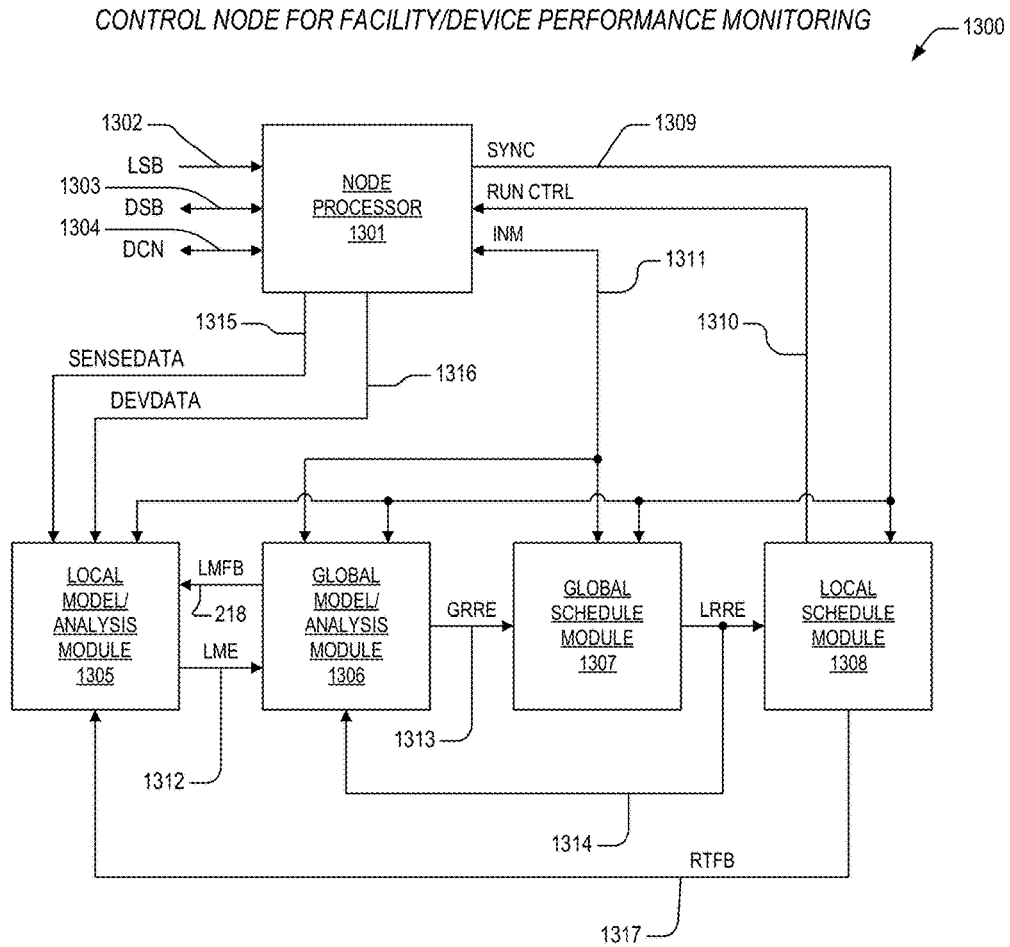
FIG. 13 is a block diagram featuring a control node according to the present invention for monitoring resource consumption effectiveness of a facility and/or equipment group.

Turning to FIG. 13, a block diagram is presented illustrating a control node 1300 according to the present invention that provides additional capabilities for equipment and facility modeling over the control node 200 of FIG. 2. The control node 1300 comprises substantially the same elements as the node 200 of FIG. 2 with the exception that a local model/analysis module 1305 is substituted for the local model module 205, and a global model/analysis module 1306 is substituted for the global model module 206.

In operation, elements of the control node 1300 function substantially the same as like named elements of the control node 200 of FIG. 2, except that additional features are provided for in the local model/analysis module 1305 to perform the functions noted above, and additional features are provided for in the global model/analysis module 1306 to perform aggregate and global modeling of equipment and/or facility operation, in addition to demand management. In one embodiment, algorithms in the modules 1305-1306 are executed to perform the above noted functions.

Figure 14:
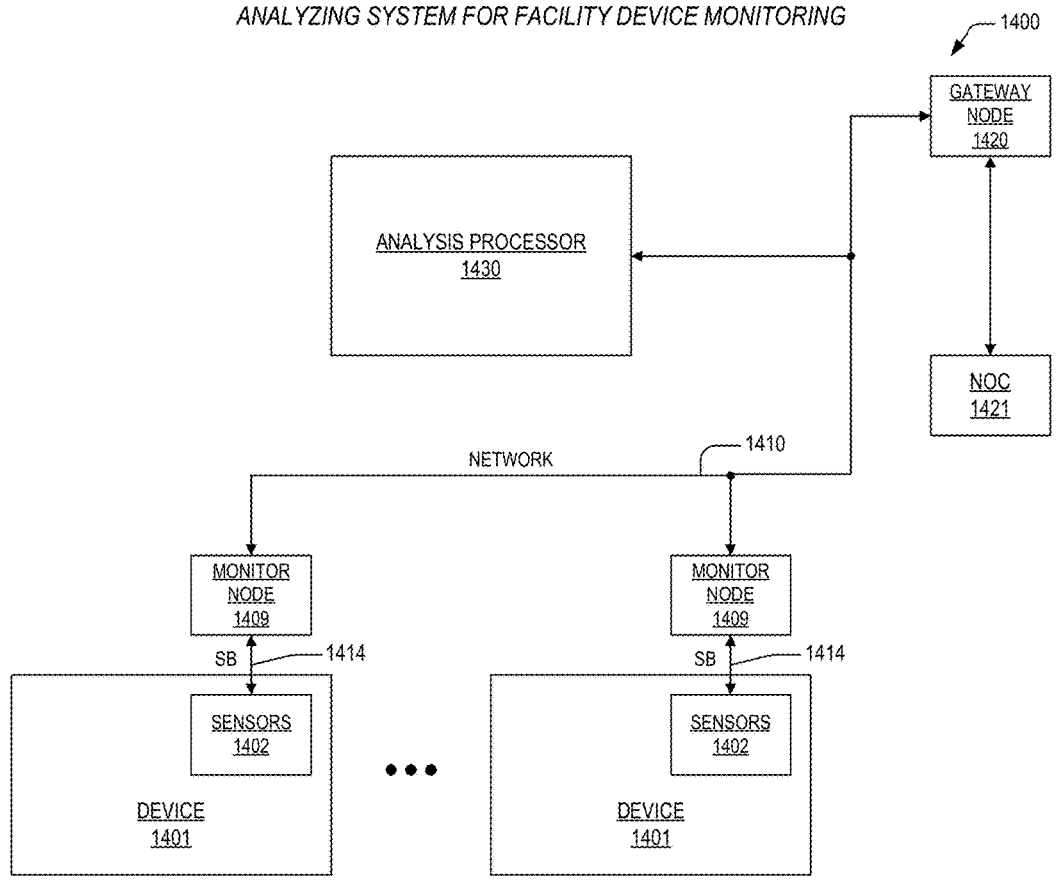
FIG. 14 is a block diagram illustrating an analyzing system for facility device monitoring according to the present invention.

Turning to FIG. 14, a block diagram is presented illustrating an alternative embodiment of an equipment and/or facility operation analysis system 1400 that performs the functions described above as a stand-alone system. That is, the system 1400 of FIG. 14 is not configured to perform demand management, but only configured to perform equipment and/or facility analysis. Accordingly, the embodiment of FIG. 14 may utilize lower cost, simpler monitor nodes 1409 that do not incorporate the local and global models discussed with reference to FIGS. 1-7, but that instead utilize a separate analyzing processor 1430 that contains the local model data for each device in the system as well as the global model data for the entire system 1400.

The system 1400 includes one or more devices 1401 having one or more corresponding resource sensors 1402 coupled thereto or disposed therein. Each device 1401 is coupled to a corresponding monitor node 1409, and the monitor nodes 1409 are coupled to the analysis processor 1430 via a network 1410 substantially like the network 110 of FIG. 1. The network 1410 may also be coupled to a gateway node 1420 that is coupled via known means (e.g., WAN or LAN) to a network operations center 1420.

In operation, the sensors 1402 sense resource consumption of the devices 1401 and provide this data to the monitor nodes 1409 via sense busses SB 1414. The monitor nodes 1414 transmit the resource consumption data to the analysis processor 1430 for tagging and analysis over the network 1410. The analysis processor 1430 is configured to develop local model data for each device in the system 1400 as well as a global model for the entire system 1400. The analysis processor 1430 analyses the data against expected results from the models and develops a list of devices 1401 whose results deviated from that expected. The analysis processor 1430 employ the exception data along with data provided regarding normal equipment operation to determine actions to correct, repair, or improve the devices 1401 and/or the system 1400 as a whole. The analysis processor 1430 also formats the results of the analysis and transmits these to the NOC 1420 via the gateway node 1420. In one embodiment, the normal (expected) device operational data and lists of actions (e.g., corrective, repair, etc.) are transmitted to the analysis processor 1430 from the NOC 1421.

Figure 15:
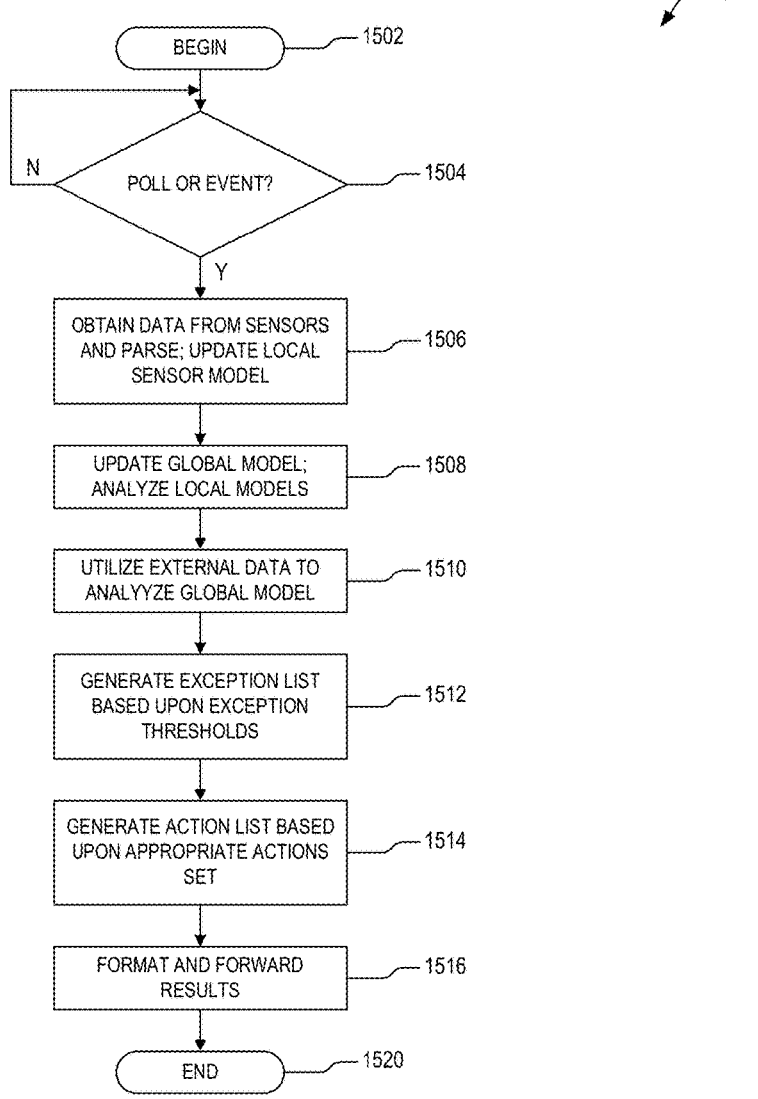
FIG. 15 is a flow diagram illustrating how devices and/or a facility are monitored for nominal operation a demand control system like that of FIG. 1 that utilizes enhanced control nodes 1300 of FIG. 13 or by the analyzing system 1400 of FIG. 14.

Now referring to FIG. 15, a flow diagram is presented illustrating how devices and/or a facility are monitored for nominal operation a demand control system like that of FIG. 1 that utilizes enhanced control nodes 1300 of FIG. 13 or by the analyzing system 1400 of FIG. 14. Flow begins at block 1502 where monitored and/or controlled devices 1401 are operating. Flow then proceeds to decision block 1504.

At decision block 1504, it is determined whether a polling timeout or resource consumption event has occurred. In one embodiment, the control nodes/monitor nodes are polled periodically for resource consumption data. In another embodiment, a change in resource consumption causes a monitoring event to occur, thus resulting in transmission of a consumption message over the network to other control nodes or to the analysis processor 1430. If the timeout/event has not occurred, monitoring continues at decision block 1504. If it has occurred, then flow proceeds to block 1506.

At block 1506, resource consumption data is obtained from the devices 1401 by the control/monitor nodes and local models are updated by the control nodes 1300/analysis processor 1430. Flow then proceeds to block 1508.

At block 1508, the global model is updated by the control nodes 1300/analysis processor 1430. Flow then proceeds to block 1510.

At block 1510, the normal operational data provided, in one embodiment, by the NOC 1421, is employed by the control nodes 1300/analysis processor 1430 to analyze device performance as represented in the global model. Flow then proceeds to block 1512.

At block 1512, the control nodes 1300/analysis processor 1430 generate an exception list of devices and/or facility operation based upon thresholds and other data included in the normal operational data. Flow then proceeds to block 1514.

At block 1514, the control nodes 1300/analysis processor 1430 generates an action list base upon a set of appropriate actions (e.g., maintenance, repair, call police) provided along with the normal operational data. Flow then proceeds to block 1516.

At block 1516, the control nodes 1300/analysis processor 1430 format and forward these results to the NOC. Flow then proceeds to block 1520.

At block 1520, the method completes.

Several embodiments of the present invention have been described above to address a wide variety of applications where modeling and managing resource demand for a system of devices is a requirement. In many instances, the present inventors have observed that demand of a particular resource (e.g., electricity) may be managed by mechanisms other than deferral and advancement of both device schedules and/or their associated duty cycles. As a result, the present inventors have noted that the interrelationship of related devices may be exploited to achieve a level of comfort as is defined above that minimizes consumption of the resource.

Consider, for example, the interrelationship of an air conditioner, a humidifier, and occupant lighting in the management of the consumption of electricity where the level of comfort includes the body temperature sensations of one or more facility occupants (e.g., humans). One skilled in the art will appreciate the level of comfort sensed by an occupant is a function of more variables than mere ambient air temperature, which is controlled by the air conditioning system. The occupant's perception of temperature is also affected by the level of humidity, which may be controlled by the humidifier, and by the color of interior lighting. It is beyond the scope of the present application to provide an in depth discussion of how variations in air temperature, humidity, and lighting color affect an occupant's perception of body temperature. It is rather sufficient to appreciate that these variables may be modulated within acceptable ranges to maintain a given level of comfort. And the present inventors have noted that these interrelationships may be exploited according to the present invention to provide given level of comfort for the occupant while minimizing demand. In the example above, consider the level of consumption of the resource for each individual devices. Say that air conditioning requires the most electricity, the humidifier requires a medium amount of electricity, and changing the color temperature of occupant lighting requires the least amount of energy. Consequently, the present inventors have observed that demand may be reduced by utilizing color temperature control or humidity control in lieu of changing the air temperature.

Accordingly, an embodiment of the present invention is provided below that is directed towards managing demand of a resource through substitution of devices within a comfort range. It is noted that although the embodiment will be discussed below with reference to devices related to the control of air temperature, the present invention is not to be restricted to control of such a variable by specific devices. Rather, it should be appreciated that an air temperature example is presented to clearly teach important aspects of the present invention, and that other embodiments may easily be derived by those skilled in the art to control demand of other resources through substitution of interrelated devices.

Figure 16:
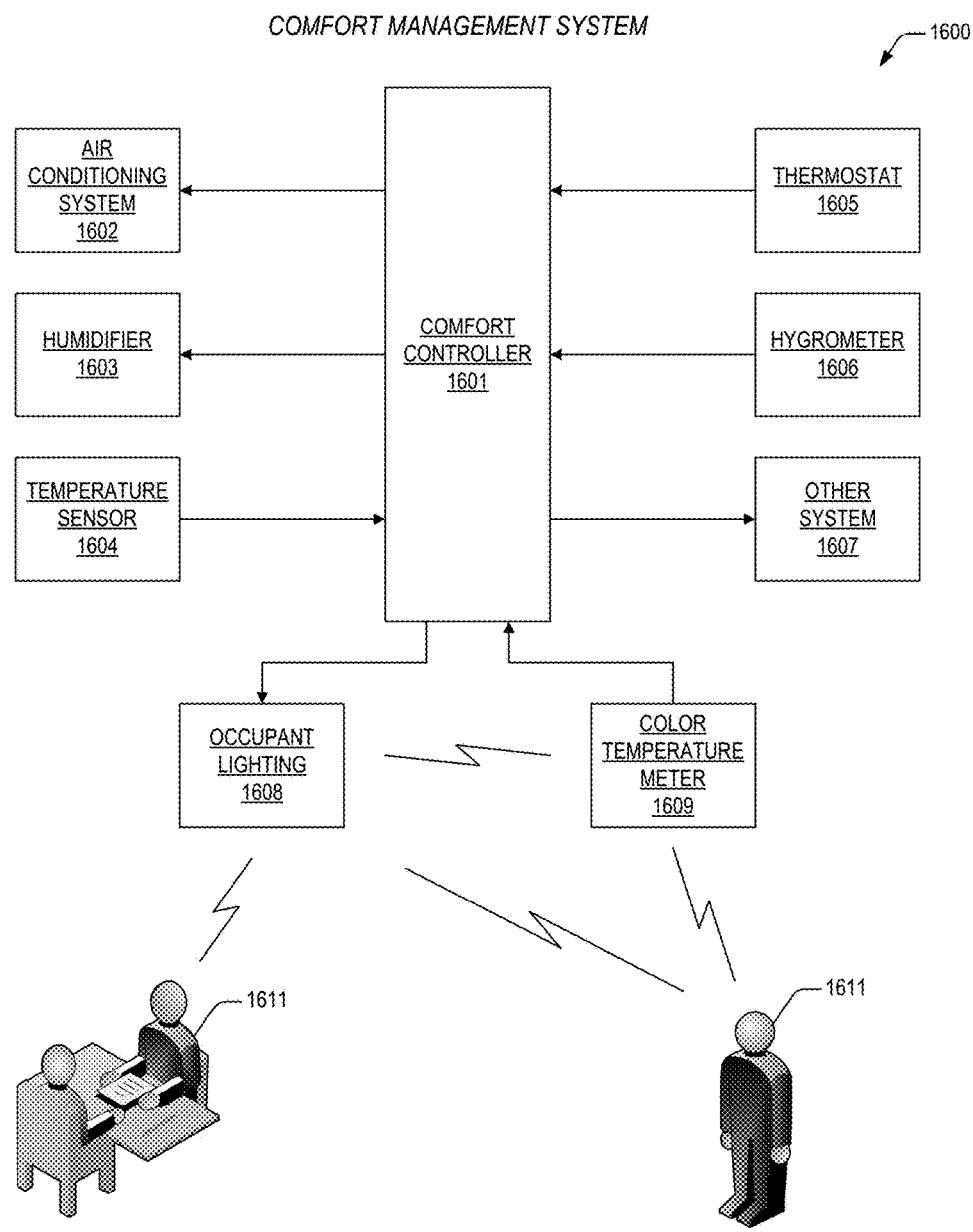
FIG. 16 is a block diagram detailing a comfort management system according to the present invention.

Turning to FIG. 16, a block diagram is presented detailing a comfort management system 1600 according to the present invention. The system 1600 includes a comfort controller 1601 that is coupled to an air conditioning system 1602, a humidifier 1603, a temperature sensor 1604, occupant lighting 1608, a color temperature meter 1609, a thermostat 1605, a hygrometer 1606, and an other system 1607 (e.g., one or more fans, one or more heated/cooled seats, etc.). The system 1600 may also include one ore more facility occupants 1611.

In operation, the comfort controller 1601 is configured to receive air temperature settings from the thermostat 1605 and to control the level of comfort for the occupants 1611 by manipulating the schedules and duty cycles of the air conditioning system 1602, the humidifier 1603, the occupant lighting 1608 (by changing the color temperature), and the other system 1607 in a manner such that demand of a corresponding resource (e.g., electricity) is optimized. The comfort controller 1601 is also configured to receive data associated with the air temperature, humidity, and lighting color temperature from the temperature sensor 1604, the hygrometer 1606, and the color temperature meter 1609, respectively. The comfort controller 1601 is further configured to perform the above noted functions in such a way as to generate, maintain, and update local device models, a global system model, a global system schedule, and local device schedules as has been previously described with reference to FIGS. 1-7.

Accordingly, the system 1600 comprehends integration into the demand control network 100 of FIG. 1 by coupling appropriate control nodes 103, sensor nodes 106, and/or monitor nodes 109 to the devices 1602-1609 and to employ models within the control nodes 103 to affect control of the level of comfort by substituting activation of one or more of the controllable devices 1602-1604, 1607-1608 in order to optimize demand of the resource. The system 1600 further comprehends a stand-alone system 1600, like the analysis system 1400 of FIG. 14, by coupling appropriate control nodes 103, sensor nodes 106, and/or monitor nodes 109 to the devices 1602-1609 and employing the comfort controller 1601 to perform all the functions necessary to generate, update, and maintain models and schedules for all the devices 1602-1609 in the system 1600 and to affect control of the level of comfort by substituting activation of one or more of the controllable devices 1602-1604, 1607-1608 in order to optimize demand of the resource.

Figure 17:
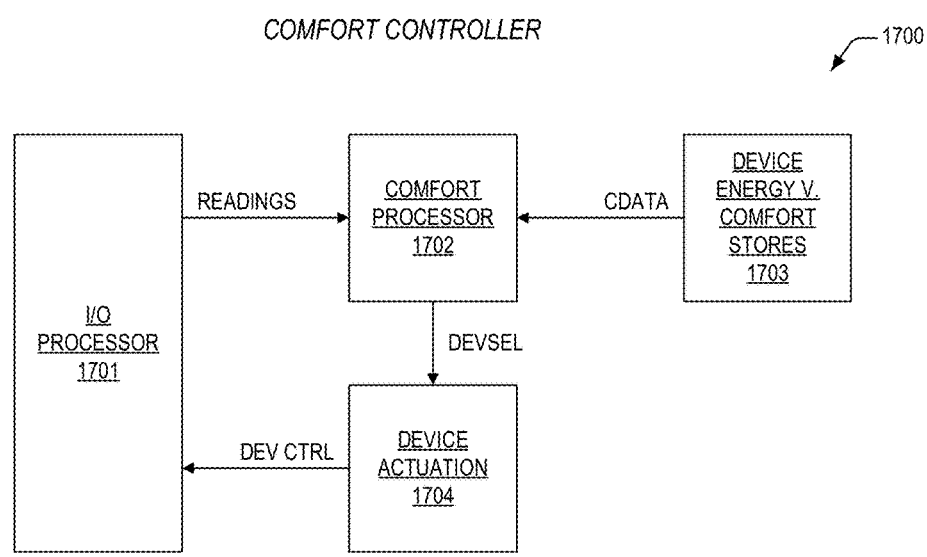
FIG. 17 is a block diagram showing a comfort controller according to the system of FIG. 16.

Referring FIG. 17, a block diagram is presented showing a comfort controller 1700 according to the system of FIG. 16. As noted above, the comfort controller 1700 may be disposed in one or more control nodes in a demand control network, where the control nodes are modified to add the supplemental functions of controlling the level of comfort for the system 1600 by substituting activation of one or more of the controllable devices 1602-1604, 1607-1608. The controller 1700 may alternatively be disposed as a stand-alone unit. The controller 1700 includes an input/output (I/O) processor 1701 that is coupled to a comfort processor 1702 via a readings bus READINGS. The comfort processor 1702 is coupled to device energy v. comfort stores 1703 via a comfort data bus CDATA, and to device actuation 1704 via a device select bus DEVSEL. The device actuation 1704 is coupled to the I/O processor 1701 via a device control bus DEVCTRL.

Operationally, the I/O processor 1701 is configured to receive data from the system devices including state and sensor data. The I/O processor 1701 is also configured to control the state of controllable devices. Exemplary devices and controllable devices include, but are not limited to, air conditioners, heaters, humidifiers, thermostats, temperature sensors, hygrometers, occupant lighting, ambient light sensors, light color sensors, multi-zone infrared temperature sensors, air flow sensors, fans, and heated/cooled seating. In a stand-alone configuration, the I/O processor 1701 is also configured to coupled the comfort controller to a user interface via a display with user controls and/or via a communications interface that couples to a set of user controls and displays. In the stand alone configuration, the comfort controller also includes a real time clock (not shown) to enable stand alone modeling and scheduling.

Device states, sensor data, and optional user controls are provided to the comfort processor 1702 over READINGS. The comfort processor 1702 generates, updates, and maintains local models, global models, global schedules, and local schedules for all devices in the system and furthermore utilizes comfort data provided by the stores 1703 to substitute devices in the system for other devices in order to optimize demand of the resource while maintaining a given comfort level. Devices that are selected for state changes are provided to the device actuation 1704 over DEVSEL. The device actuation 1704 is configured to control the controllable devices as directed via DEVSEL. Device control data is sent to the I/O processor 1701 via DEVCTRL.

The present inventors have additionally observed capabilities according to the present invention to model a system of devices, both locally and globally, and to schedule those devices for operation in order to optimize demand of a resource is useful as a technique for identifying and vetting candidate facilities for application of one or more embodiments of a demand coordination network as described above. Accordingly, a mechanism is provided that utilizes data external to one or more facilities (e.g., buildings) in order to synthesize local models, global models, global schedules, and local schedules for those facilities in order to determine candidates for application of a demand coordination network. The candidate list may be employed by marketing and/or sales organizations associated with the demand coordination network or may be utilized by governing entities, resource distributors, and the like.

Figure 18:
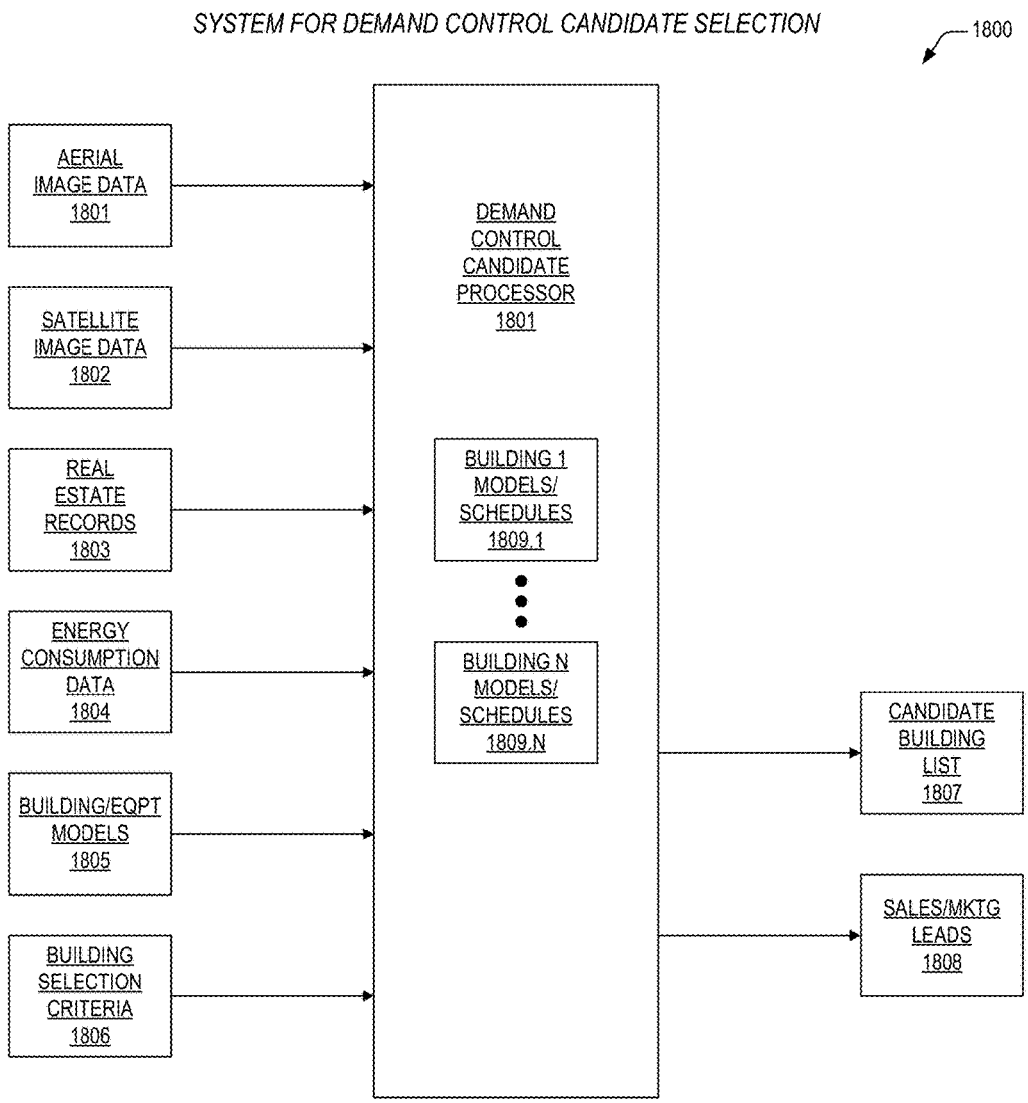
FIG. 18 is a block diagram depicting a demand control candidate selection system according to the present invention.

Referring now to FIG. 18, a block diagram is presented depicting a demand control candidate selection system 1800 according to the present invention. The system 1800 includes a demand control candidate processor 1801 that includes one or more sets of synthesized models (local and global) and schedules (local and global) 1809.1-1809.N, where each set corresponds to a corresponding one or more buildings. The processor 1801 receives data from one or more optional stores 1801-1806 including, but not limited to, aerial image data 1801, satellite image data 1802, real estate records 1803, energy consumption data 1804, building/equipment models 1805, and building selection criteria 180. The processor 1801 identifies one or more candidate buildings for application of demand coordination techniques and provides the one or more candidate buildings to output stores 1807-1808 including, but not limited to, a candidate building list 1807 and sales/marketing leads 1808.

In operation, the system 1800 operates as a stand-alone demand coordination synthesis system substantially similar to the stand-alone embodiments discussed above with reference to FIGS. 14 and 16-17 by utilizing data provided by the stores 1801-1806 to synthesize local/global models and schedules 1809.1-1809.N for each building that is identified for evaluation. In one embodiment, the building selection criteria 1806 comprises thresholds for demand of a resource based upon building size.

Many of the loads and resource consuming devices corresponding to a particular building can be visually identified remotely via the use of the aerial image data 1801 and/or the satellite image data 1802. More specifically, the processor 1801 is configured to employ image processing algorithms to determine prospective candidate buildings. The processor 1801 is also configured to utilize the real estate records 1803, energy consumption data 1804, and building/equipment models 1805 to determine, say, building ownership, building occupants, building design configuration, and estimated energy demand.

Accordingly, the processor 1801 employs the data noted above to synthesize corresponding local/global models/ schedules 1809.1-1809.N for the devices and loads which were identified. Those buildings whose models/schedules 1809.1-1809.N satisfy the building selection criteria 1806 are marked as candidate buildings and the list of building candidates is provides to the candidate building list 1807 and/or the sales/marketing leads 1808.

Although the present invention and its objects, features, and advantages have been described in detail, other embodiments are encompassed by the invention as well. For example, the present invention has been primarily described herein as being useful for managing consumption side peak demand. However, the scope of the present invention extends to a system of devices (e.g., generators) on the supply side for controlling the supply of a resource. Such is an extremely useful application that is contemplated for supply of a resource by a resource supplier having numerous, but not simultaneously operable supply devices. One such example is a state-wide electrical supply grid.

In addition, the present invention comprehends geographically distributed systems as well to include a fleet of vehicles or any other form of system whose local environments can be modeled and associated devices controlled to reduce peak demand of a resource.

Moreover, the present invention contemplates devices that comprise variable stages of consumption rather than the simple on/off stages discussed above. In such configurations, a control node according to the present invention is configured to monitor, model, and control a variable stage consumption device.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for controlling peak demand of a resource within a facility, the apparatus comprising:
   a monitor node, disposed within the facility, coupled to a non-system energy consuming device and to a demand coordination network, configured to determine and broadcast whether said non-system device is consuming the resource;
   a first control node, disposed within the facility and coupled to a second control node via said demand coordination network, said first control node comprising:
      a node processor, coupled to a first energy consuming device, configured to transmit sensor data and device status via said demand coordination network for generation of a plurality of run time schedules, and configured to operate said first energy consuming device within an acceptable operating margin to maintain a first local environment by cycling on and off according to said plurality of run time schedules; and
   a network operations center (NOC), disposed external to the facility, configured to generate said plurality of run time schedules to control the peak demand of the resource, wherein one or more run times start prior to peak demand of the resource to maintain corresponding local environments, said NOC comprising:
      a global schedule module, operationally coupled to said first node processor, configured to coordinate run times for said first energy consuming device and a second energy consuming device, wherein coordination is based on a global run time schedule, an adjusted first descriptor set characterizing said first local environment, and an adjusted second descriptor set characterizing a second local environment, and energy consumption data broadcast by said monitor node.

2. The apparatus as recited in claim 1, wherein coordination of said run times for said first and second energy consuming devices comprises advancing a first one or more of a plurality of start times, deferring a second one or more of said plurality of start times, and increasing one or more of a plurality of duty cycles.

3. The apparatus as recited in claim 1, wherein said NOC develops sets of descriptors, each set characterizing an associated one of said corresponding local environments.

4. The apparatus as recited in claim 3, wherein said NOC employs said sensor data and said device status to adjust associated sets of descriptors.

5. The apparatus as recited in claim 1, wherein said NOC develops and maintains said global run time schedule that specifies start time, duration, and duty cycle for said first and second energy consuming devices.

6. The apparatus as recited in claim 1, wherein said NOC further comprises:
   a local model module, coupled to said global model module, configured to develop a third descriptor set characterizing a third local environment associated with said first energy consuming device.

7. The apparatus as recited in claim 6, wherein said NOC further comprises:
   a global model module, coupled to said local model module and said global schedule module, configured to develop said adjusted first and second descriptor sets, wherein said adjusted first and second descriptor sets are based upon said third descriptor set, a fourth descriptor set characterizing a fourth local environment associated with said second energy consuming device, and global sensor data received over said demand coordination network.

8. The apparatus as recited in claim 1, wherein said demand coordination network comprises an IEEE 802.15.4 wireless network.

9. A peak demand control system, for managing peak energy demand within a facility, the peak demand control system comprising:
   a monitor node, disposed within the facility, coupled to a non-system energy consuming device and to a demand coordination network, configured to determine and broadcast whether said non-system device is consuming the resource;
   a first control node, disposed within the facility and coupled to a second control node via said demand coordination network, said first control node comprising:
      a node processor, coupled to a first energy consuming device, configured to transmit sensor data and device status via said demand coordination network for generation of a plurality of run time schedules, and configured to operate said first energy consuming device within an acceptable operating margin to maintain a first local environment by cycling on and off according to said plurality of run time schedules; and
   a network operations center (NOC), disposed external to the facility, configured to generate said plurality of run time schedules to control peak demand of a resource, wherein one or more run times start prior to said peak demand of said resource to maintain corresponding local environments, said NOC comprising:
  a global schedule module, operationally coupled to said first node processor, configured to coordinate run times for said first energy consuming device and a second energy consuming device, wherein coordination is based on a global run time schedule, an adjusted first descriptor set characterizing said first local environment, and an adjusted second descriptor set characterizing a second local environment, and energy consumption data broadcast by said monitor node; and
  one or more sensor nodes, disposed within the facility, coupled to said demand coordination network, configured to provide one or more global sensor data sets to said NOC, wherein said NOC employs said one or more global sensor data sets in determining said run times.

10. The peak demand control system as recited in claim 9, wherein coordination of said run times for said first and second energy consuming devices comprises advancing a first one or more of a plurality of start times, deferring a second one or more of said plurality of start times, and increasing one or more of a plurality of duty cycles.

11. The peak demand control system as recited in claim 9, wherein said NOC develops sets of descriptors, each set characterizing an associated one of said corresponding local environments.

12. The peak demand control system as recited in claim 11, wherein said NOC employs said sensor data and said device status to adjust associated sets of descriptors.

13. The peak demand control system as recited in claim 9, wherein said NOC develops and maintains said global run time schedule that specifies start time, duration, and duty cycle for said first and second energy consuming devices.

14. The peak demand control system as recited in claim 9, wherein said NOC generates two or more of said plurality of run time schedules for said each of said plurality of devices, and wherein said each of said plurality of control nodes selects one of said two or more of said plurality of run time schedules for execution based upon latency of last communication with said NOC.

15. The peak demand control system as recited in claim 9, wherein said demand coordination network comprises an IEEE 802.15.4 wireless network.

16. A method for controlling peak demand of a resource within a facility, the method comprising:
  coupling a first control node, a second control node, and a monitor node together within the facility via a demand coordination network;
  via the monitor node, determining and broadcasting whether a non-system device is consuming the resource;
  via the first control node, transmitting sensor data and device status via the demand coordination network for generation of a plurality of run time schedules, and operating a first energy consuming device within an acceptable operating margin to maintain a first local environment by cycling on and off according to the plurality of run time schedules; and
  via a network operations center (NOC) disposed external to the facility, generating the plurality of run time schedules to control the peak demand of the resource, wherein one or more run times start prior to the peak demand of the resource to maintain corresponding local environments, and coordinating run times for the first energy consuming device and a second energy consuming device, wherein coordination is based on a global run time schedule, an adjusted first descriptor set characterizing the first local environment, and an adjusted second descriptor set characterizing a second local environment, and energy consumption data broadcast by the monitor node.

17. The method as recited in claim 16, wherein coordination of the run times for the first and second energy consuming devices comprises advancing a first one or more of a plurality of start times, deferring a second one or more of the plurality of start times, and increasing one or more of a plurality of duty cycles.

18. The method as recited in claim 16, wherein the NOC develops sets of descriptors, each set characterizing an associated one of the corresponding local environments.

19. The method as recited in claim 18, wherein the NOC employs the sensor data and the device status to adjust associated sets of descriptors.

20. The method as recited in claim 16, wherein the NOC develops and maintains a global run time schedule that specifies start time, duration, and duty cycle for the first and second energy consuming devices.

* * * * *